(12) United States Patent
Tokui et al.

(10) Patent No.: US 6,754,991 B2
(45) Date of Patent: Jun. 29, 2004

(54) AUTOMOBILE DOOR AND ANNULAR MODULE FRAME THEREFOR

(75) Inventors: Takeshi Tokui, Wako (JP); Kenichi Ishikawa, Chita-gun (JP); Fumio Noguchi, Chita-gun (JP); Mitsuo Hasunuma, Aiko-gun (JP); Hideyuki Hashimoto, Aiko-gun (JP)

(73) Assignees: Honda Giken Kogyo Kabushiki Kaisha, Tokyo (JP); Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/073,862

(22) Filed: Feb. 14, 2002

(65) Prior Publication Data

US 2002/0112406 A1 Aug. 22, 2002

Related U.S. Application Data

(63) Continuation of application No. PCT/JP01/05153, filed on Jun. 15, 2001.

(30) Foreign Application Priority Data

Jun. 16, 2000 (JP) ........................................ 2000-181705
Jun. 16, 2000 (JP) ........................................ 2000-181706
Jun. 20, 2000 (JP) ........................................ 2000-184808

(51) Int. Cl.[7] ................................................ B60J 1/17
(52) U.S. Cl. ........................................................ 49/502
(58) Field of Search ................ 49/502, 358; 296/146.1, 296/146.2, 146.5, 146.6

(56) References Cited

U.S. PATENT DOCUMENTS

| | | | | |
|---|---|---|---|---|
| 2,650,857 A | * | 9/1953 | Watter et al. ................. | 49/502 |
| 3,370,384 A | * | 2/1968 | Hafer et al. .................. | 49/502 |
| 4,306,381 A | * | 12/1981 | Presto .......................... | 49/502 |
| 4,691,475 A | * | 9/1987 | Maekawa ..................... | 49/352 |
| 4,845,894 A | * | 7/1989 | Herringshaw et al. ........ | 49/502 |
| 4,984,389 A | * | 1/1991 | Benoit et al. ................. | 49/502 |
| 5,095,659 A | * | 3/1992 | Benoit et al. ................. | 49/502 |
| 5,226,259 A | * | 7/1993 | Yamagata et al. ............ | 49/502 |
| 5,417,470 A | * | 5/1995 | Holt ........................... | 296/188 |
| 5,469,668 A | * | 11/1995 | Heim et al. ................... | 49/502 |
| 5,749,176 A | * | 5/1998 | Heim et al. ................... | 49/502 |
| 5,857,731 A | * | 1/1999 | Heim et al. .............. | 296/146.2 |
| 6,223,472 B1 | * | 5/2001 | Ishikawa et al. ............. | 49/502 |
| 6,233,875 B1 | * | 5/2001 | Carlo et al. ................... | 49/502 |
| 6,241,307 B1 | * | 6/2001 | Kim ....................... | 296/146.8 |
| 6,305,129 B1 | * | 10/2001 | Eckhardt et al. ............. | 49/502 |
| 6,397,524 B1 | * | 6/2002 | Sakaguchi et al. ............ | 49/375 |
| 6,543,838 B1 | * | 4/2003 | Bertolini et al. ......... | 296/146.1 |

FOREIGN PATENT DOCUMENTS

| | | |
|---|---|---|
| JP | 4-197829 | 7/1992 |
| JP | 2520718 | 5/1996 |
| JP | 11-350829 | 12/1999 |
| WO | WO 01/45975 | 6/2001 |

* cited by examiner

*Primary Examiner*—Gregory J. Strimbu
(74) *Attorney, Agent, or Firm*—Oblon, Spivak, McClelland, Maier & Neustadt, P.C.

(57) ABSTRACT

A door module for an automobile door with a main body having a housing portion disposed adjacent to a window opening. The door module is housed in the housing portion and attached to the main body. The door module includes a windowpane, door equipment including at least a regulator, and a module frame on which the door equipment is integrally held. The module frame has an annular shape. The regulator is provided with a rail for guiding the windowpane when the windowpane is moved by the motor. The motor is disposed in the annular shape of the module frame, and at least one end of the rail is projects from the annular shape of the module frame and is fixed to the door main body.

8 Claims, 21 Drawing Sheets

(A)  (B)

(A)

(B)

Fig. 21
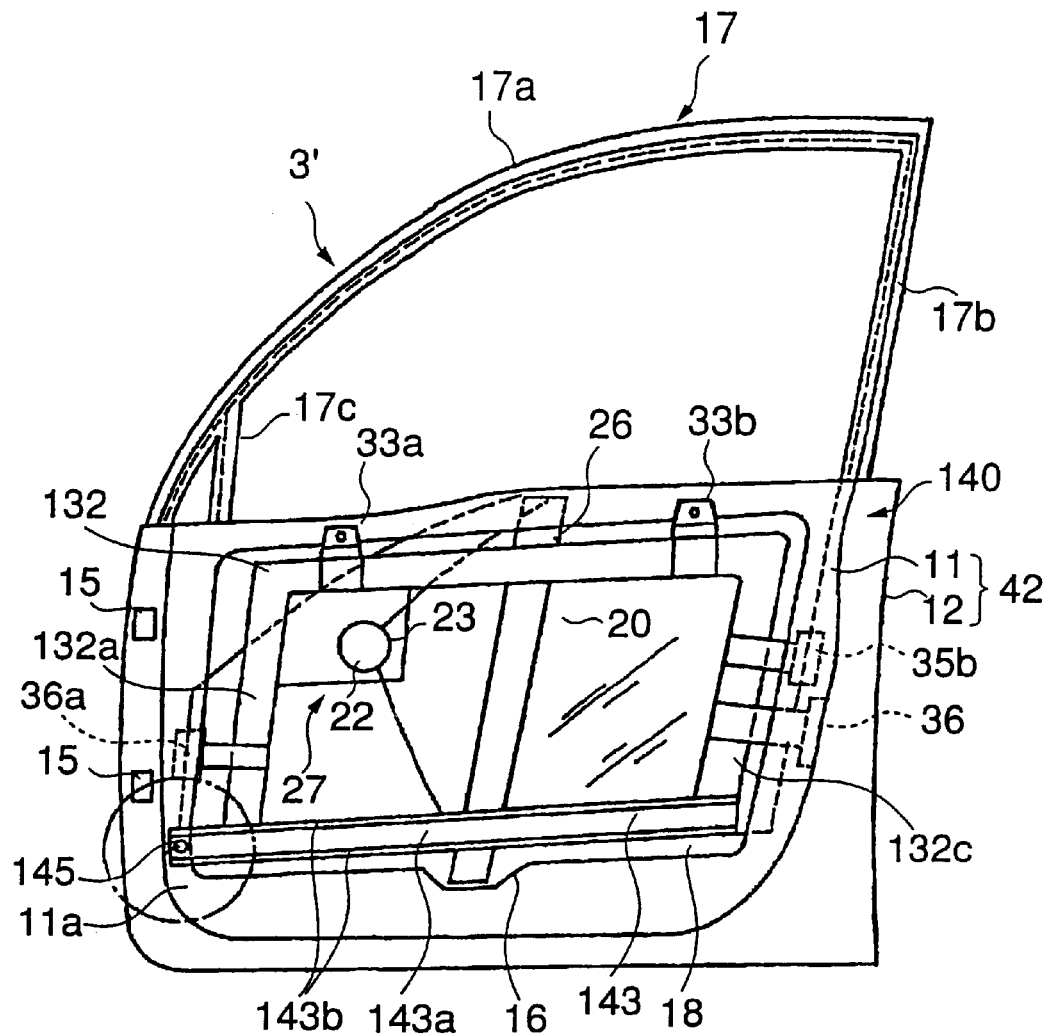
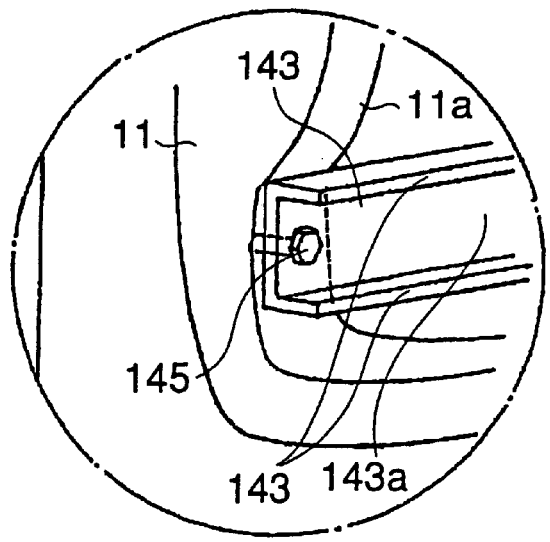

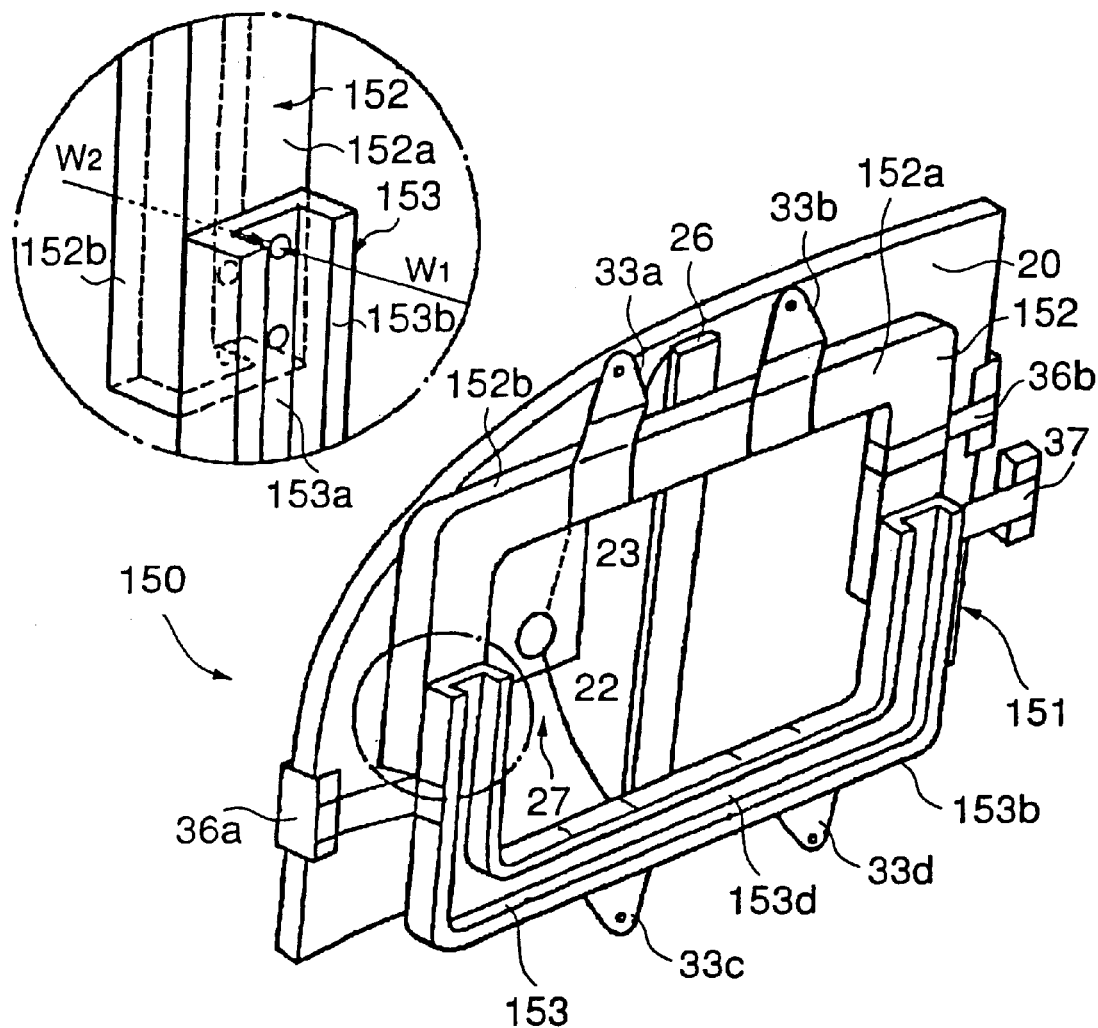

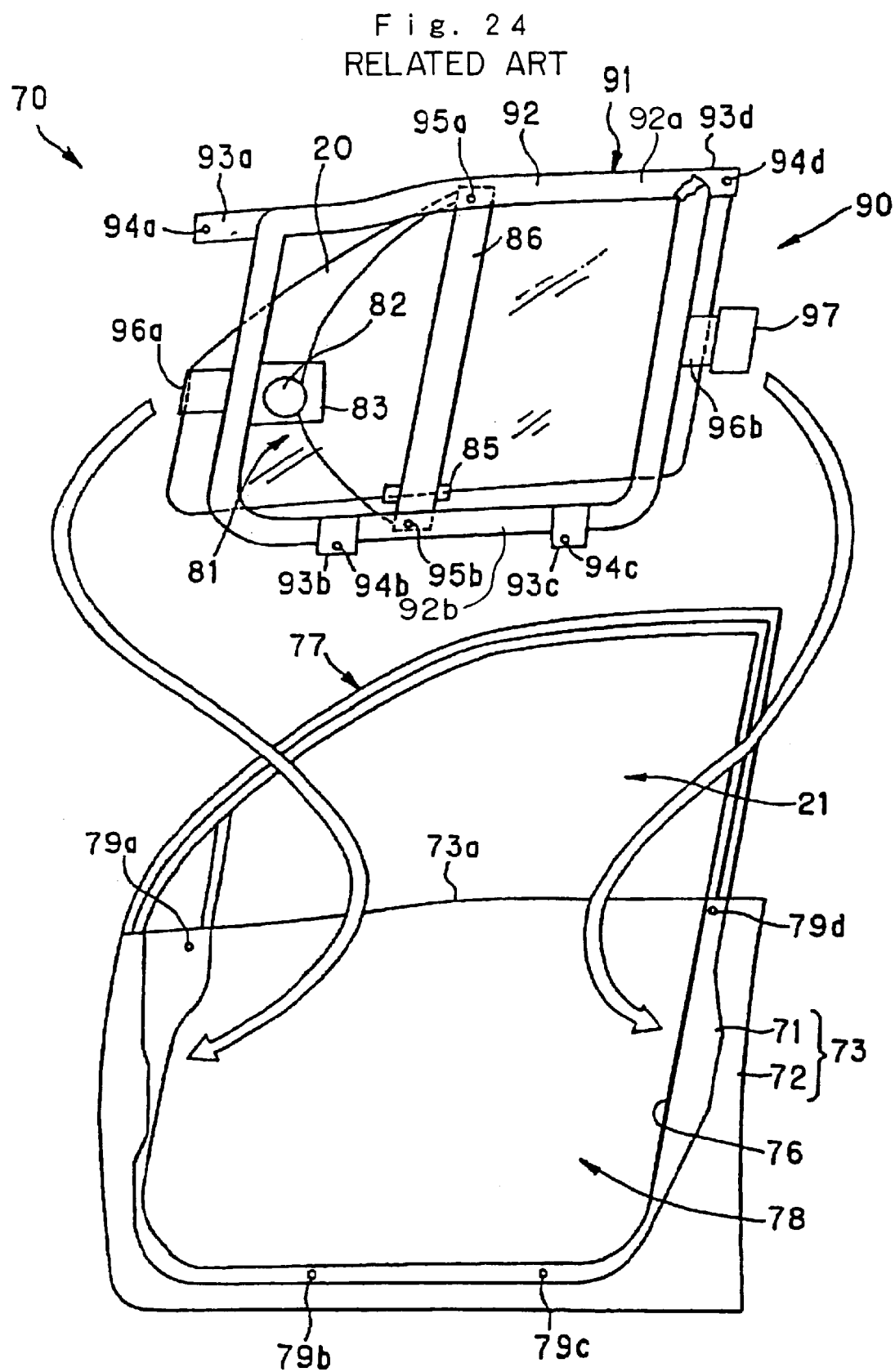

AUTOMOBILE DOOR AND ANNULAR MODULE FRAME THEREFOR

TECHNICAL FIELD

The present invention relates to an automobile door and an automobile door module.

BACKGROUND ART

In general, the automobile door is provided with a windowpane for opening and closing a window opening, a door main body having a housing portion disposed under the window opening, which is capable of housing the windowpane, and a window regulator for vertically moving the windowpane between the window opening and the housing portion.

In order to simplify the assembling process, there has proceeded to arrange parts constituting the automobile door in the form of module, recently. An automobile door 70 as shown in FIG. 24 is formed by attaching a door module 90 to a door main body 73 which can be opened and closed with respect to the automobile main body (not shown). The door main body 73 is provided with an inner panel 71 and an outer panel 72. The inner panel 71 and the outer panel 72 are formed integrally by welding or the like so that a space (a housing portion) 78 can be formed between them. The inner panel 71 is provided with a mounting opening 76 for inserting a glass sheet 20 in the door module 90. The inner panel 71 is provided with fitting holes 79a to 79d for fitting the door module 90 to a predetermined position.

Above the door main body 73, a frame-like sash 77 is provided to project therefrom. In this case, a window opening 21 is defined in the portion surrounded by the sash 77 and a belt line mole 73a of the door main body 73. In the case of a so-called hardtop type automobile, the window opening is formed in the portion surrounded by the belt line mole of the door main body and the automobile main body when the door is closed, although not shown.

The door module 90 holds a door equipment such as the glass sheet 20, the regulator and so on integrally. The module frame 91 is formed into a substantially □-like form in a side view by connecting a first frame 92a of substantially linear form with a second frame 92b of substantially U-letter like form. At predetermined positions in the first frame 92a and the second frame 92b, brackets 93a to 93d are provided. In the brackets 93a to 93d, fitting holes 94a to 94d are provided.

The regulator 81 comprises a carrier plate 85 for supporting the glass sheet 20 and a motor 82 for moving the carrier plate 85 along a guide rail 86. The guide rail 86 is attached to the module frame 91 by means of a fixing means 95a which penetrates the first frame 92a and an upper end of the guide rail 86, and a fixing means 95b which penetrates a lower side of the second frame 92b and a lower end of the guide rail 86. The motor 82 is attached to the module frame 91 by interposing a base plate (seat) 83 for the motor. The module frame 91 is attached with guide members 96a, 96b for guiding a vertical movement of the glass sheet 20 and a latch 97 for locking the door 70 with respect to the automobile main body.

The distance (height) between the upper end and the lower end of the guide rail 86 is formed to be wider than the height (the dimension in a direction of the vertical movement of the glass sheet 20) of the glass sheet 20. Also, the distance (height) between the first frame 92a and the lower side of the second frame 92b is formed to be wider than the height of the glass sheet 20. Namely, the height of the module frame 91 is determined so as to be wider than the height of the glass sheet 20.

When the door module 90 is attached to the door main body, and the carrier plate 85 supporting the glass sheet 20 is at a position where it is moved to the proximity of the lower side of the second frame 92b, the glass sheet 20 is in a state that it is completely housed in the housing portion 78 through the window opening 21 (a full open state of window) (see FIG. 24).

In order to attach the door module 90 to the door main body 73, the glass sheet 20 of the door module 90 is first inserted into the housing portion 78 through the mounting opening 76. Then, the brackets 93a to 93d are disposed on a car interior side surface of the inner panel 71, and the positions of the fitting holes 94a to 94d of the brackets 93a to 93d are aligned with the positions of the fitting holes 79a to 79d of the inner panel 71. Then, fixing means such as clips are inserted into the fitting holes 94a to 94d of the brackets 93a to 93d and the fitting holes 79a to 79d of the inner panel 71. Thus, the door module 90 is attached to the door main body 73.

It is desired that such door module satisfies the following two items: (1) the securing of a predetermined strength-rigidity and (2) weight saving. If predetermined strength-rigidity can not be secured, there causes a problem that the glass sheet can not smoothly be moved vertically between the housing portion and the window opening. A heavy door module makes an attaching work of the door module to the door main body difficult, in addition that it is difficult to save the weight of the automobile. However, an attempt to secure a predetermined strength causes an increase of the weight totally. Accordingly, the items of (1) and (2) contradict each other. This will be explained in detail in the following.

First, the module frame 91 of the door module 90 has the structure described below in order to secure a predetermined strength-rigidity. The module frame 91 has an outer dimension corresponding to the substantially entire region of the mounting opening 76. The dimension in a vertical direction of the module frame 91 is larger than the dimension in a vertical direction of the glass sheet 20. However, a larger dimension of the module frame 91 makes the fitting work of the door module 90 to the door main body 73 difficult. Namely, there is apt to occur interference between the module frame 91 and the inner panel 71 at the time of the fitting work because the dimension of the mounting opening 76 has a certain limit. As the dimension of the module frame 91 is larger, the weight of the door increases.

As means for saving the weight of the door module, it can be considered that a thin belt-like belt is used for the material for constituting the module frame, or the outside dimension of the module frame is made small. Since use of such means causes naturally the reduction of the strength.rigidity, it is necessary to use a reinforcing member to the module frame. The addition of the reinforcing member increases the number of parts of the door module whereby the door module becomes heavy. In order to secure the strength of the module frame without increasing the number of parts, it is considered to increase the rigidity of each frame member. In order to increase the rigidity of the frame members themselves, there comes that the material for the frame itself is thick or frame member is formed into a cylindrical shape.

As described above, the requirements of (1) the securing of a predetermined strength-rigidity and (2) weight saving contradict each other. The object of the present invention is to provide an automobile door and an automobile door module in which the weight is reduced without causing the reduction of the strength.

DISCLOSURE OF THE INVENTION

As the basic structure for satisfying both requirements of (1) the securing of a predetermined strength-rigidity and (2) weight saving, the inventions having the following structure are provided. An automobile door comprising a door main body having a housing portion which is disposed adjacent to a window opening of an automobile and is capable of housing a windowpane for opening and closing the window opening and a door module housed in the housing portion and attached to the door main body, wherein the door module comprises the windowpane, a door equipment including at least a regulator having a motor for moving the windowpane between the window opening and the housing portion, and a module frame on which the door equipment is integrally held, and wherein the module frame comprises an annularly formed elongated member in a side view, and an automobile door module used for the automobile door.

In this specification, "a side view" is a view in a direction of penetrating the windowpane (in a thickness direction of the windowpane). In this specification, the terms "front", "rear", "upper", "lower", "inside" and "outside" used for expressing a direction or a position means "front", "rear", "upper", "lower", "inside" and "outside" in the case that the automobile door or the automobile door module is attached to the automobile main body.

As the concrete structure for satisfying both requirements of (1) the securing of a predetermined strength.rigidity and (2) weight saving, the first to fourth inventions having further specified structure as described below, are provided. The first invention is the invention concerning the following structure. An automobile door comprising a door main body having a housing portion which is disposed adjacent to a window opening of an automobile and is capable of housing a windowpane for opening and closing the window opening and a door module attached to the door main body, wherein the door module comprises the windowpane and a door equipment including at least a regulator having a motor for moving the windowpane between the window opening and the housing portion, which are integrally held on a module frame, and wherein the module frame is formed into an annular form in a side view; the regulator is provided with a rail for guiding the windowpane when the windowpane is moved by the motor; the motor is disposed in the annulus of the module frame, and at least one end of the rail is projected from the annulus of the module frame and fixed to the door main body.

According to such automobile door, at least one end of the rail of the regulator is projected outside the annular module frame in a side view, and is fixed to the door main body, whereby the strength (rigidity) of the module frame can be improved. Accordingly, it is possible to reduce the dimension in a vertical direction of the module frame while a sufficient strength is maintained, and the weight saving of the module frame can be achieved.

It is preferable that the base plate for supporting the motor of the regulator is fixed to the module frame, and the motor is attached to the module frame by means of the base plate. In this case, it is preferable to fix at least an upper edge or a lower edge of the base plate to the module frame. Further, it is preferable that the length between an upper end and a lower end of the base plate (the outside dimension in a vertical direction of the base plate) and the length between an upper end of an upper side and a lower end of a lower side of the module frame (the outside dimension in a vertical direction of the module frame) are substantially in agreement with each other. Thus, a defective operation of the windowpane can be prevented by reducing the outside dimension of the module frame as possible to reduce the weight of the door, and making the fitting work for the door module to the door main body easy.

Incidentally, "substantially in agreement" means that in a range capable of preventing the defective operation of the windowpane while the weight of the door can be reduced and the fitting work for the door module to the door main body can be made easy, the dimensions of the both members are more or less different. As an example that the dimensions of the both members are more or less different, there are such that for example, the base plate is slightly projected from the annulus of the module frame (the outside dimension in a vertical direction of the module frame is more or less smaller than the outside dimension in a vertical direction of the base plate), and either the upper edge or the lower edge of the base plate and a side edge of the base plate are fixed to the module frame (the outside dimension in a vertical direction of the module frame is more or less larger than the outside dimension in a vertical direction of the base plate).

By fixing the rail of the regulator to the door main body, the strength of the module frame could be increased, and by rendering the dimension in a vertical direction of the module frame to be smaller than the dimension in a vertical direction of the guide rail so that the weight of the module frame was reduced, it was possible to provide the automobile door having a reduced weight without causing the reduction of the strength.

The motor is disposed in the annular module frame in a side view to utilize effectively the space in the module frame as a space for housing the motor, whereby the door module can be made small. As a result, the fitting work for the door module to the door main body can be easy.

The guide rail may be fixed to the door main body with its upper end; may be fixed to the door main body with lower door end, or may be fixed to the door may body with its upper and lower ends. When the upper and lower ends of the guide rail are fixed to the door main body, the upper and lower ends of the guide rail have to be projected from the outside of the annulus of the module frame. Accordingly, the module frame itself are not fixed to the door main body in a position above or below the module frame. Accordingly, it is preferable to project either one of the upper and lower ends of the guide rail outside of the annulus of the module frame so that an upper portion or a lower portion of the module frame itself is fixed to the door main body. It is in particular preferable to project the lower end of the guide rail outside of the annulus of the module frame from the viewpoint that a space can be formed in a lower portion of the housing portion of the door.

It is preferable for the module frame to use an elongated member having a C-letter like form (a squarish C-letter like form) in cross section, which has a rear plate and a pair of side plates extending from the rear plate. Thus, it is possible to further improve the strength of the module frame while weight increasing can be suppressed. In this case, it is preferable that the rear plate of the module frame is disposed at a car exterior side so that a C-letter like recess opens toward a car interior side. With this, it can be easy to fix the base plate for the motor, brackets and so on to the rear plate of the module frame by spot welding or fastening. Namely, a door equipment can easily be fixed to the module frame.

From the viewpoint that the C-letter like elongated member in cross section as the module frame is preferable in order to satisfy both requirements of (1) the securing of a predetermined strength-rigidity and (2) weight saving, the second inventions are inventions having the following structure. An automobile door comprising a door main body having a housing portion which is disposed adjacent to a window opening of an automobile and is capable of housing a windowpane for opening and closing the window opening and a door module housed in the housing portion and attached to the door main body, wherein the door module comprises the windowpane, a door equipment including at least a regulator having a motor for moving the windowpane between the window opening and the housing portion, and a module frame on which the door equipment is integrally held, and wherein the module frame is made of a C-letter like elongated member in cross section, which has a rear plate disposed at a car exterior side and a pair of side plates extending at a car interior side from the rear plate so as to be spaced apart from each other, and an automobile door module used for the automobile door.

According to such automobile door and door module, the module frame has the C-letter like form, which has the rear plate and the pair of side plates extending from the rear plate, whereby the strength of the module frame can be improved while the weight increasing can be suppressed. Since the rear plate in the portion of the C-letter like form in cross section of the module frame is disposed at a car exterior side, and the space between the pair of side plates extending toward a car interior side is provided, in other words, the car interior side surface of the module frame is opened, it is easy to fix the rear plate to the door equipment by spot welding or fastening. Namely, the fixing of the door equipment to the module frame can be easy.

The module frame can be formed by bending a single C-letter like elongated member in cross section having a rear plate and a pair of side plates extending from the rear plate. For example, a single elongated member is formed by extrusion-molding aluminum so that a rear plate and side plates extending from the rear plate are provided, whereby a C-letter like recess defined by the rear plate and both side plates can be formed. Then, the elongated member is cut with a predetermined length (a length in substantially agreement with the entire circumferential length of the module frame). By bending the cut elongated member into a predetermined shape, the module frame is formed. It is preferable to form the module frame by bending a single elongated member because the number of parts can be reduced in comparison with a case that the module frame is formed by connecting a plurality of elongated members.

From the viewpoint of forming the module frame satisfying the requirements of (1) the securing of a predetermined strength.rigidity and (2) weight saving, by bending a single elongated member or connecting a plurality of elongated members, the third inventions are inventions having the structure described below. An automobile door comprising a door main body having a housing portion which is disposed adjacent to a window opening of an automobile and is capable of housing a windowpane for opening and closing the window opening and a door module housed in the housing portion and attached to the door main body, wherein the door module comprises the windowpane, a door equipment including at least a regulator having a motor for moving the windowpane between the window opening and the housing portion, and a module frame on which the door equipment is integrally held, and wherein the module frame is made of an elongated member having a substantially annularly formed portion in a side view; an end portion of the elongated member is disposed in the vicinity of the connected portion of the elongated member; a bracket as a separate body which serves as a fitting member for fitting the module frame to the door main body is attached to the end portion and the connected portion, and the end portion is connected to the connected portion by means of the bracket, and an automobile door module used for the automobile door.

In this automobile door module and door, the connection of the end portion of the elongated member to the connected member (e.g., the other end portion of the elongated member) is conducted by means of the bracket. Accordingly, even though a single elongated member is shorter than a predetermined dimension, a dimensional error can be absorbed by the bracket, and the bracket can be placed at the correct position.

Such automobile door module and door can certainly be attached to the door main body. Further, in such automobile door module and door, the door equipment can correctly be placed on the door main body, without requiring a high dimensional accuracy to the elongated member.

The automobile door module and door of the third inventions include the module frame formed by bending an elongated member in a predetermined shape. In particular, the module frame is useful in a case that an only single elongated member is bent in a predetermined shape. Namely, when an elongated member is bent, for instance, when an extruded aluminum member having a predetermined thickness or a special shape in cross section is bent, there is a case that the bending operation is difficult due to the rigidity of the elongated member. The difficulty in the bending operation may easily cause a reduction in accuracy in the bent shape by the reason that the position to be bent is not an intended position. Accordingly, the shape formed by bending the elongated member does sometimes not agree with a predetermined shape of the module frame in a side view. On the other hand, even when the shape formed by bending the elongated member does not agree with a predetermined shape of the module frame in a side view, the bracket can be placed at the correct position by connecting the end portion of the elongated member to the connected portion by means of the bracket.

Accordingly, when the module frame, in which error in the shape in a side view is apt to occur, is formed by bending an elongated member, the application of the automobile door module, door according to the third inventions, or the method for producing these according to the third inventions are useful. The error in the shape in a side view is, in particular, apt to occur when the module frame is formed by bending a single elongated member. Accordingly, the application of the automobile door module or door according to the third inventions is, in particular, useful when the module frame is formed by a single elongated member.

From the viewpoint of satisfying requirements of (1) the securing a predetermined strength-rigidity and (2) weight saving by using a C-letter like elongated member in cross section, and from the viewpoint of making the processing of the door module easy by forming the module frame with a plurality of elongated members, the fourth inventions are inventions having the structure described below. An automobile door comprising a door main body having a housing portion which is disposed adjacent to a window opening of an automobile and is capable of housing a windowpane for opening and closing the window opening and a door module housed in the housing portion and attached to the door main body, wherein the door module comprises the windowpane, a door equipment including at least a regulator having a motor for moving the windowpane between the window opening and the housing portion, and a module frame on which the door equipment is integrally held, and wherein the module frame is formed to have an annular form in a side view, by connecting a plurality of elongated members wherein in the elongated members, at least a lower frame member which forms a lower side of the module frame is made of a C-letter like member in cross section, which has a first rear plate disposed at a car exterior side and a pair of first side plates extending at a car interior side from the first rear plate so as to be spaced apart from each other, and the shape in cross section in an arranged state of an upper frame member other than the lower frame member in the elongated members is different from the shape in cross section in an arranged state of the lower frame member, and an automobile door module used for the automobile door.

"The shape in cross section in a state of arrangement is different" means that in a state that the module frame is formed, the shapes in cross section including the direction of the arranged upper frame member and lower frame member are different. Namely, there is a case that the shape in cross section of the upper frame member is different from the shape in cross section of the lower frame member in view from any direction, or a case that although the shape in cross section of the upper frame member and the shape in cross section of the lower frame member are the same when the directions of them are aligned, only the directions of them in cross section in a state that they are assembled into the module frame are different. For example, there is a case that the shape in cross section of the upper frame member is a C-letter like shape as well as the lower frame member, and the direction of the extension of a side plate of the upper frame member is different from the direction of the extension of the lower frame member. Such case is included in the case of "the shape in cross section in a state of arrangement is different". For the lower frame member, a linear shape in a side view can be used. Further; a curved shape or a bent shape in a side view can be employed.

According to the automobile door and door module of the fourth inventions, the number of times of bending operations to a single elongated member can be reduced, and the bending operation can be easy because a plurality of elongated member are connected so that the module frame is formed to have an annular form in a side view. For the lower frame member, a C-letter like elongated member in cross section, which has the first rear plate and the pair of first side plates extending from the first rear plate, is used, whereby the strength of the module frame can be improved while weight increasing can be suppressed.

Further, since the first rear plate of the lower frame member is disposed at a car exterior side and the pair of first side plates extending toward a car interior side are spaced apart, in other words, the car interior side surface of the lower frame member is opened, the fixing of the rear plate to the upper frame member and so on can be easily conducted by spot welding or fastening with a bolt. Accordingly, the automobile door provides a high producibility, an improvement of the strength while an increasing of weight and a completed assembling work can be suppressed, as well as providing reliable operation to the door equipment.

In the automobile door and door module of the fourth inventions, it is preferable that the upper frame member is made of a C-letter like member in cross section, which has a second rear plate arranged at a car interior side and a pair of second side plates extending at a car exterior side from the second rear plate so as to be spaced apart from each other, and the second rear plate of the upper frame member is joined to the first rear plate of the lower frame member. By such, it can be easy to fix the rear plate of the C-letter like upper frame member in cross section having an opened car exterior side surface to the rear plate of the C-letter like lower frame member in cross section having an opened car interior side surface by spot welding or fastening with a bolt. When the module frame is formed by connecting two elongated members having the same shape in a side view, such as a substantially L-letter like or U-letter like shape in a side view, for instance, the module frame having an annular shape in a side view is easily obtainable. An intermediate frame member or a connecting member may be provided between the upper frame member and the lower frame member of the module frame to connect them. When the intermediate frame member is provided, the module frame is constituted by three or more elongated members. In consideration of obtaining easiness for forming the module frame and providing a high strength to it, it is preferable to form the module frame by using two elongated members as the upper frame member and the lower frame member.

In the above-mentioned inventions, it is preferable to use a wire type regulator as the regulator. The wire type regulator is provided with a rail which is extended along a direction of the vertical movement of the windowpane, in order to guide a carrier plate which supports the windowpane. By fixing, for instance, a lower end of the rail to, for instance, an inner panel of the door main body, the strength of the door module can be improved. The technical concept of these inventions can easily be realized by using the wire type regulator.

BRIEF DESCRIPTION OF THE DRAWINGS

FIG. 21 is a side view showing a modified example of the third embodiment of the present invention.

FIGS. 22A and 22B are perspective views showing a fourth embodiment of the present invention.

FIGS. 23A and 22B are perspective views showing a fifth embodiment of the present invention.

FIG. 24 is an exploded side view showing a conventional automobile door.

BEST MODE FOR CARRYING OUT THE INVENTION

Figure 1:
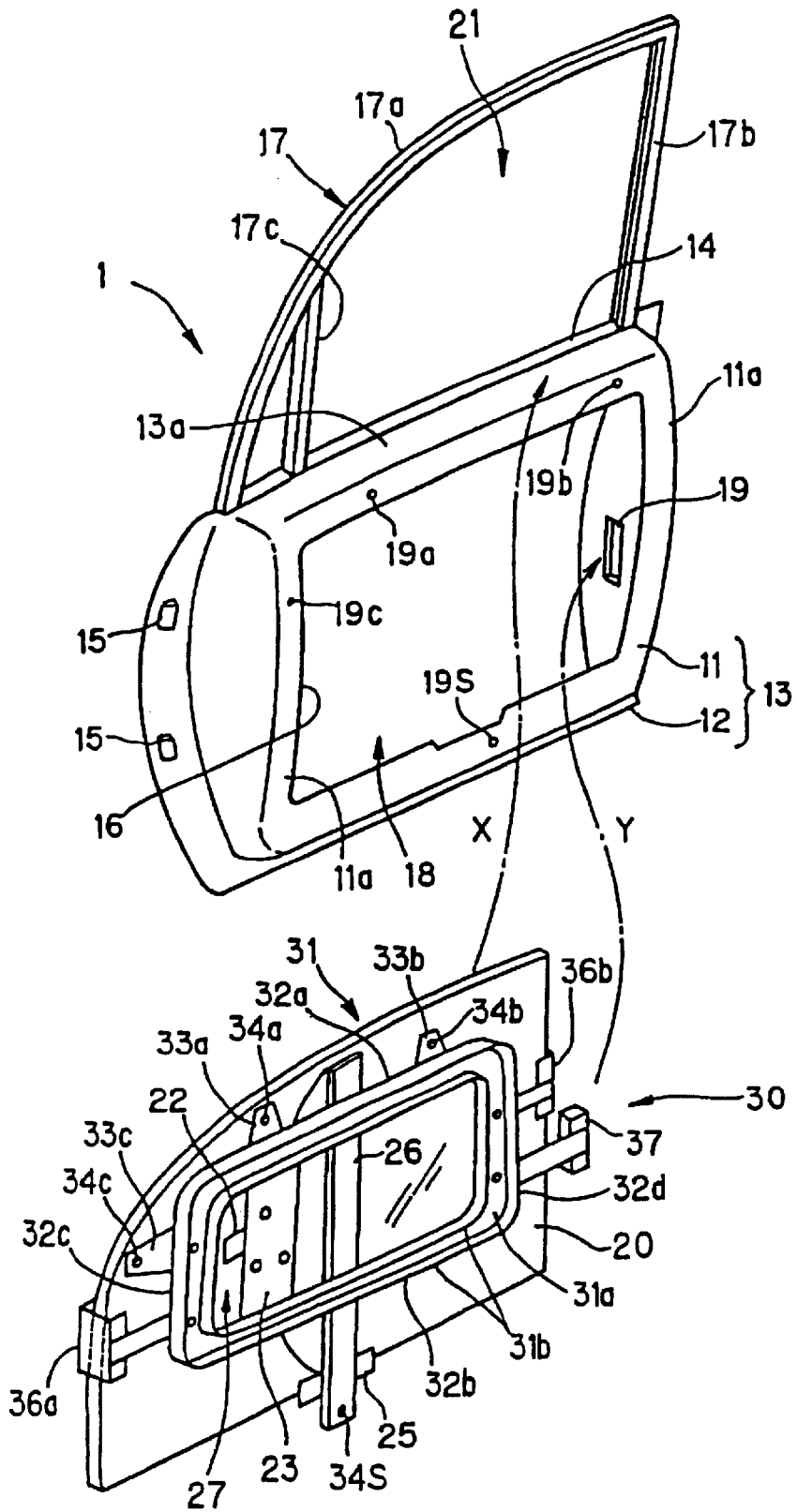
FIG. 1 is an exploded perspective view showing a first embodiment of the present invention.

In the following, the embodiments of the present invention will be described in detail with reference to the drawings. In the drawings, the same or corresponding reference numerals are used for the members and so on having the same structure and function as the members and so on which have already been explained, and accordingly, explanation for these members and so on is simplified or omitted.

An automobile door 1 shown in FIG. 1 is for a front seat in an automobile. The automobile door 1 is constituted by attaching a door module 30 to a door main body 13 which is fitted to the automobile main body (not shown) so as to be capable of opening and closing, by means of connecting portions 15 provided at a front side of the automobile door 1.

An inner panel 11 and an outer panel 12 of the door main body 13 are integrated so that a housing portion 18 is formed therebetween. A mounting opening 16 having a substantially rectangular shape in a side view is provided in a car interior side surface of the inner panel 11.

Fitting holes 19a to 19c and 19s are provided at predetermined locations of the car interior side surface 11a of the inner panel, which remains at the circumferential edge of the mounting opening. At an upper end of the door main body 13, a slot 14 for vertical movement for a glass sheet 20 is defined by an upper side of the inner panel 11 and an upper side of the outer panel 12 so as to be along a belt line 13a. At an upper end of the door The sash 17 comprises a first sash 17a along a front pillar and the roof of the automobile main body, a second sash 17b connected to an end portion (at a right end in the drawing) of the first sash 17a so as to be along a center pillar and a third sash 17c connected to the other end of the first sash 17a. The second sash 17b and the third sash 17c are substantially linear and parallel to each other. A window opening 21 is defined by the first sash 17a, the second sash 17b, the third sash 17c and the belt line 13a of the door main body 13.

The door module 30 is an integrated body comprising a module frame 31 and a door equipment such as the glass sheet 20, a regulator 27 and so on held on the module frame. The module frame 31 is a substantially □-letter like form (an annular form) in a side view, and includes an upper side 32a, a lower side 32b, a front side 32c and a rear side 32d. The module frame 31 is made of a C-letter like member in cross section having a rear plate 31a and a pair of side plates 31b extending from the rear plate 31a. The module frame 31 in this embodiment is made of an elongated member obtained by extrusion-molding aluminum. Namely, the module frame 31 is formed into a substantially □-letter like form in a side view by cutting a single elongated member having a C-letter like shape in cross section which is provided with the rear plate 31a and the pair of side plates 31b, and bending the cut elongated member.

The regulator 27 in this embodiment is a wire type regulator. The regulator 27 comprises a carrier plate 25 supporting a lower end of the glass sheet 20, a guide rail 26 extending along a direction of vertical movement (a vertical direction) of the glass sheet 20 to guide the carrier plate 25 in a manner of sliding and a motor 22 for moving the carrier plate 25. An upper end of the guide rail 26 is disposed on the surface (the car exterior side surface) of the rear plate 31a, which is opposite to a side where the side plates extend, at the upper side 32a of the module frame 31, and is fixed to the upper side 32a by spot welding. A lower end of the guide rail 26 is projected downwardly from the □-letter like module frame 31 in a side view. A fitting hole 34s is formed in the lower end of the guide rail 26. The carrier plate 25 can be guided in a manner capable of sliding to the portion (the lower end) projected from the annulus of the module frame 31. Thus, the glass sheet is moved slidingly in the vertical direction by the guide rail 26 with the aid of the carrier plate 25.

The motor 22 is fixed to a base plate 23 for the motor. An upper end and a lower end of the base plate 23 are respectively arranged, at a front side of the guide rail 26, on the car exterior side surface of the upper side 32a and the front side 32c, and are fixed to the upper side 32a and the front side 32c by spot welding.

The module frame 31 is attached with brackets 33a to 33c as separate bodies. Fitting holes 34a to 34c are provided in the brackets 33a to 33c. The brackets 33a and 33b are respectively disposed at a front side and a rear side with respect to the guide rail 26 and fixed to the car exterior side surface of the upper side 32a by spot welding. The bracket 33c is disposed on the car exterior side surface of the front side 32c and fixed to the front side 32c by spot welding.

Guide members (glass sheet fitting elements) 36a and 36b which guide a front side and a rear side of the glass sheet 21 in a vertical movement are attached to the front side 32c and the rear side 32d respectively. A latch 37 for locking the automobile door 1 to the automobile door main body is attached to the rear side 32d.

The process for attaching the door module 30 to the door main body 13 will be explained. First, the glass sheet 20 of the door module 30 is inserted into the housing portion 18 through the mounting opening 16 as indicated by an arrow mark X in the figure, and it is disposed in a lower portion of the slot for vertical movement 14. In this case, as indicated by an arrow mark Y in the figure, the latch 37 is inserted into a latch hole 19 formed in a rear end of the door main body 13. Then, the brackets 33a to 33c and the lower end of the guide rail 26 are disposed on the car interior side surface 11a of the inner panel 71, which remains in a circumferential portion of the mounting opening 16. Then, the positions of the fitting holes 34a to 34c and 34s of the brackets 33a to 33c and the guide rail 26 are aligned with the fitting holes 19a to 19c and 19s of the door main body 13. Finally, the brackets 33a to 33c and the lower end of the guide rail 26 are fixed to the car interior side surface 11a by using clips, whereby the door module 30 is attached to the door main body 13.

Figure 2:
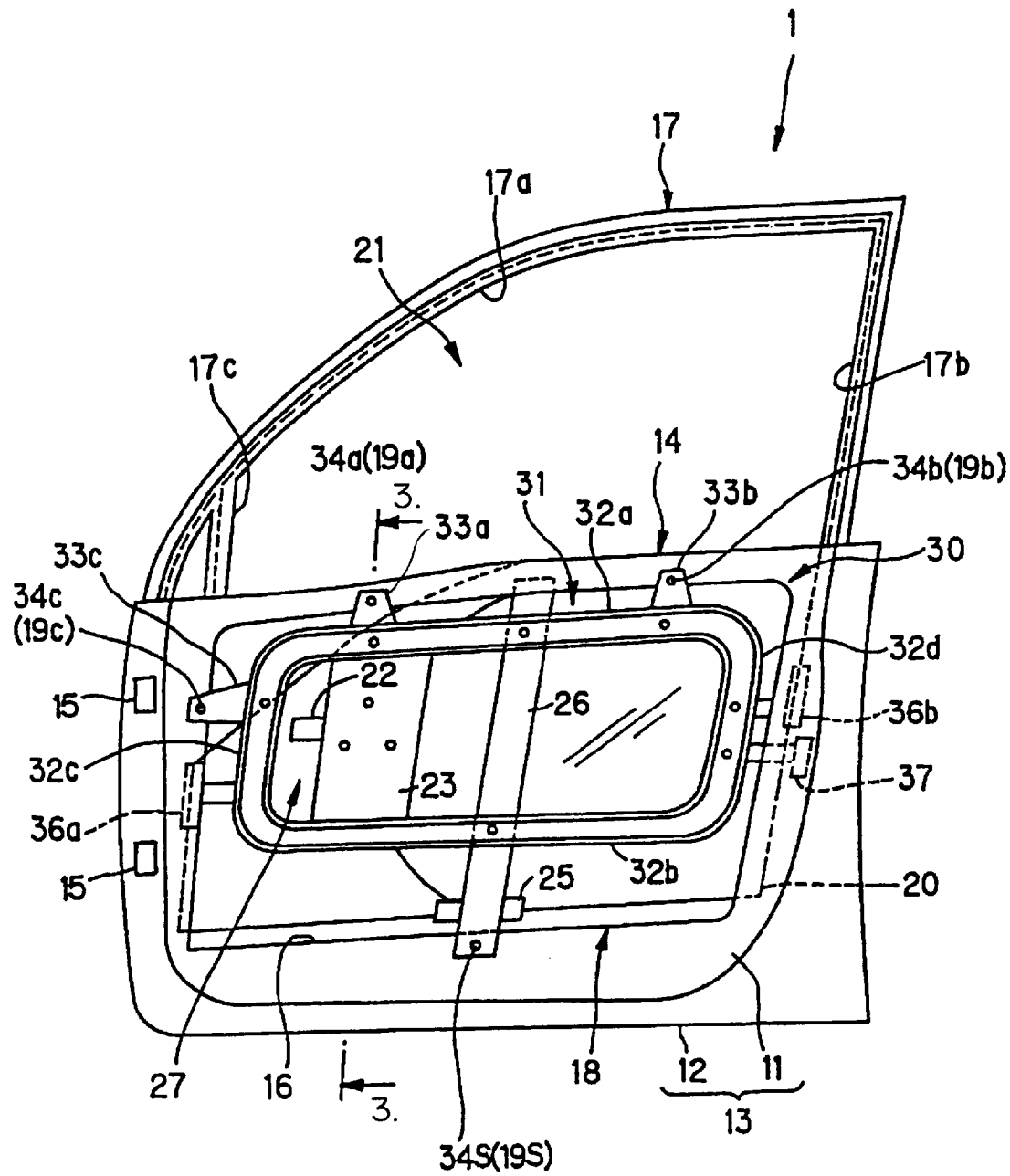
FIG. 2 is a side view of the first embodiment shown in FIG. 1.

Explanation will be made as to a state that the door module 30 is attached to the door main body 13 with reference to FIG. 2. The guide members 36a, 36b fixed respectively to the front side 32c and the rear side 32d hold the glass sheet 20 so that the glass sheet 20 is guided and can slide between the third sash 17c and the second sash 17b located above. The bent portions of the module frame 31 are not sharply bent but are smoothly curved so as to have an appropriate radius of curvature.

The dimension in width (the dimension in a lateral direction in the drawing) and the dimension in height (the dimension in a vertical direction) in a view according to a projection drawing method (a view of being projected in a direction perpendicular to the paper surface of drawing), of the substantially □-letter like module frame 31 in a side view, are respectively smaller than the dimension in width and the dimension in height of the mounting opening 16. For example, the dimension in height of the module frame 31 can be determined to be about 90% to 60% as large as the dimension in height of the mounting opening 16.

Figure 3:
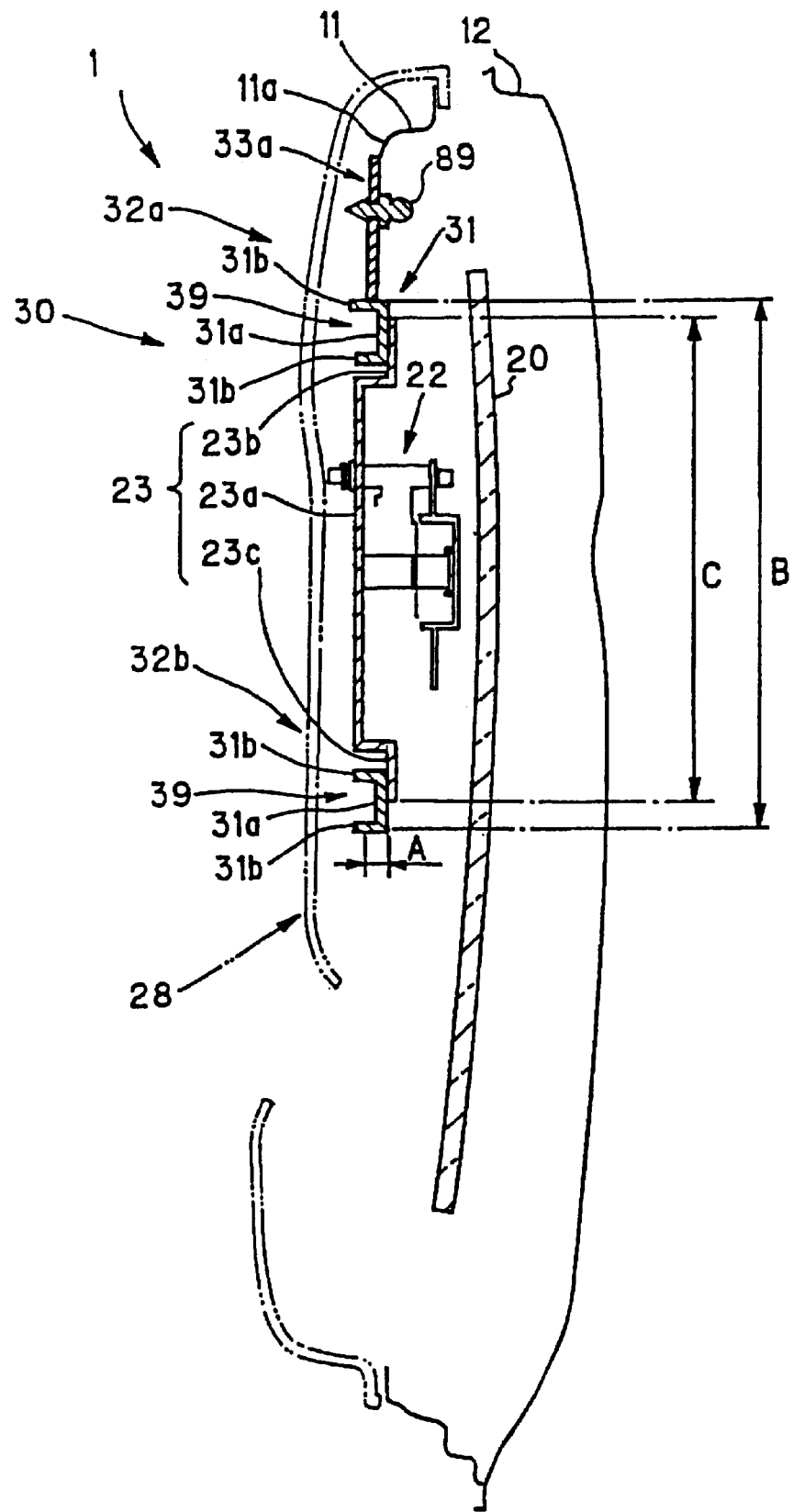
FIG. 3 is a cross-sectional view along a line III-III in FIG. 2.

The shape in cross section of the module frame will be described in more detail. FIG. 3 is a cross-sectional view along a line III—III in FIG. 2. The module frame 31 comprises the rear plate 31a and the pair of side plates 31b, 31b extending at a car interior side from the rear plate 31a so as to provide a substantially C-letter like form in cross section. The rear plate 31a and the side plates 31b, 31b define a C-letter like recess 39. An end of the brackets 33a is fixed by spot welding to the surface (the car exterior side surface) of the upper side 32a, which is opposite to the C-letter like recess 39 of the rear plate 31a. The other end of the bracket 33a is fixed to the car interior side surface 11a with a clip 89.

The base plate 23 for the motor has a flat plate like main body 23a which extends between the upper side 32a and the lower side 32b and holds motor 22. A space A is provided between the car exterior side surface of the main body 23a and the car exterior side surface of the rear plate 31a. At least a portion of the motor 22 fixed to the main body 23a is disposed at a car interior side with respect to the rear plate 31a. Namely, at least a portion of the motor 22 is housed in a space formed between the upper side 32a and the lower side 32b.

An upper end and a lower end of the main body 23a of the base plate 23 for the motor are respectively connected with an upper flange 23b and a lower flange 23c which are arranged in an offset state at a car exterior side with respect to the main body 23a. The upper flange 23b and the lower flange 23c are fixed to the car exterior side surface of the rear plate 31a by spot welding or the like. The main body 23a is fixed to the module frame 31 by the aid of the upper flange 23b and the lower flange 23c.

In this embodiment, the length C (the dimension in a vertical direction of an outer configuration of the base plate 23 for the motor) between the upper end of the upper flange 23b and the lower end of the lower flange 23b substantially agrees with the length B (the dimension in a vertical direction of an outer configuration of the module frame 31) between the upper end of the upper side 32a and the lower end of the lower side 32d (in this embodiment, the dimension C is more or less smaller than the dimension B). The reason is as follows.

The dimension C has a predetermined dimension. Namely, the motor 22 is required to have a predetermined driving force for sliding in a vertical direction the glass sheet 20 having a certain weight. In order to obtain a predetermined driving force and to support the driving force, the motor 22 itself has to have a predetermined size, and a predetermined size is also required for the base plate 23 for the motor so that it can support the motor 22. Accordingly, the dimension C should be a predetermined dimension because the glass sheet 20 having a certain weight has to be slided in a vertical direction.

On the other hand, it is desirable that the dimension B is smaller as possible from the viewpoints of weight saving and easiness on fitting operation. In this case, even when the dimension is made small as possible, the strength of the door module 30 can be assured because the guide rail 26 is projected from the annulus of the module frame 31.

When the base plate 23 for the motor is fixed to the module frame 31, it is required to fix certainly the base plate 23 for the motor to the module frame 31. If the fixing is unreliable, it is difficult to suppress vibrations caused at the time of driving the motor 22, and a defect of sliding movement of the glass sheet 20 may result. Accordingly, upper and lower ends of the base plate 23 for the motor are desirably fixed certainly to the module frame 31. In this embodiment, the outer dimension of the module frame 31 can be reduced as possible while the upper and lower ends of the base plate 23 for the motor can certainly be fixed to the module frame 31. Accordingly, the dimension C is substantially coincident with the dimension B.

The glass sheet 20 is formed to have a curve in agreement with a curved shape of the automobile door 1. A trim 28 is attached to the car interior side of the inner panel 11 so as to cover the mounting opening 16 (see FIG. 2).

Figure 4:
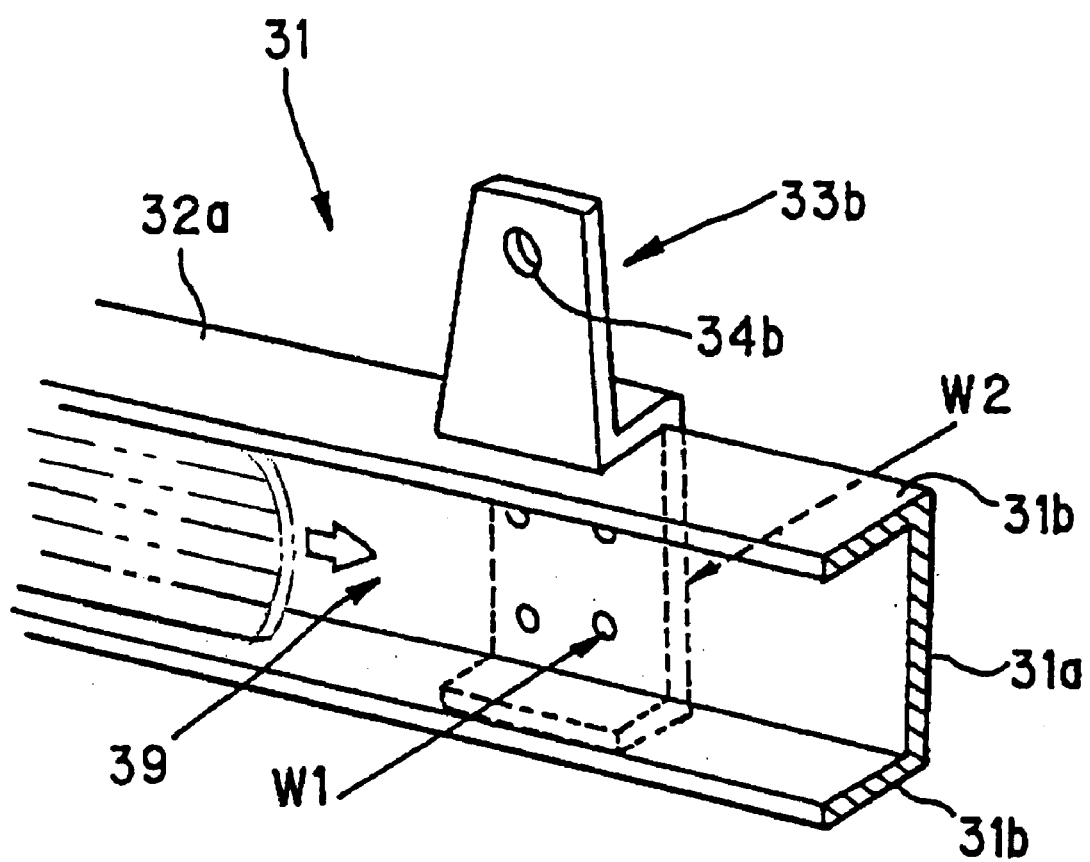
FIG. 4 is an enlarged view of an important portion of the first embodiment shown in FIG. 1.

FIG. 4 is an enlarged view of the upper side 32a and the bracket 33b fixed to the upper side 32a. When spot welding is conducted, the rear plate 31a and the bracket 33b are clamped by a welding apparatus (not shown), and they are welded as indicated by arrow marks W1, W2 in the figure. Since the module frame 31 has a C-letter like form in cross section and its car interior side surface is opened, the rear plate 31a and the bracket 33b can be clamped by the welding apparatus.

Further, an elongated member such as a wire harness or the like can be extended in the C-letter like recess 39 of the module frame 31. In the drawing, a flat wire harness 60 is extended in the C-letter like recess 39. Thus, a complicated extending work for the wire harness in assembling the door can be moderated.

As described above, the automobile door 1 is so constructed that the lower end of the guide rail of the regulator 27 is projected downward from the □-letter like module frame 31 in a side view, and is fixed to the inner panel 11, whereby the strength of the module frame 31 can be improved. By making the dimension in a vertical direction of the module frame 31 smaller than the dimension in a vertical direction of the guide rail 26, the weight of the module frame 31 can be reduced. Accordingly, the automobile door 1 can save the weight without inviting a reduction of the strength.

Further, since a portion of the motor 22 is housed in the space between the upper side 32a and the lower side 32b, the thickness (the dimension in a lateral direction in FIG. 3) of the door module 30, hence, the thickness of the automobile door 1 can be reduced.

Further, in the module frame 31, the upper side 32a, the lower side 32b, the front side 32c and the rear side 32d are constituted by an elongated member having a C-letter form in cross section, and therefore, the strength of the module frame 31 can be improved while an increase of the weight can be suppressed. Accordingly, the glass plate 20 can be moved smoothly in a vertical direction and the stability in operation of the door equipment is high. Further, since the rear plate 31a is disposed at the car exterior side so that the car interior side surface of the module frame 31 is opened, it can be easy to fix the brackets 33a to 33c as separate bodies, the guide rail 26, the guide members 36a, 36b and so on to the rear plate 31a by spot welding or the like.

In the door module in the above-mentioned embodiment, the fitting operation for fitting the door module is easy because the rail of the regulator is projected from the annulus of the module frame, and the outer dimension of the module frame is reduced as possible while the strength of the door module can be maintained.

Figure 5:
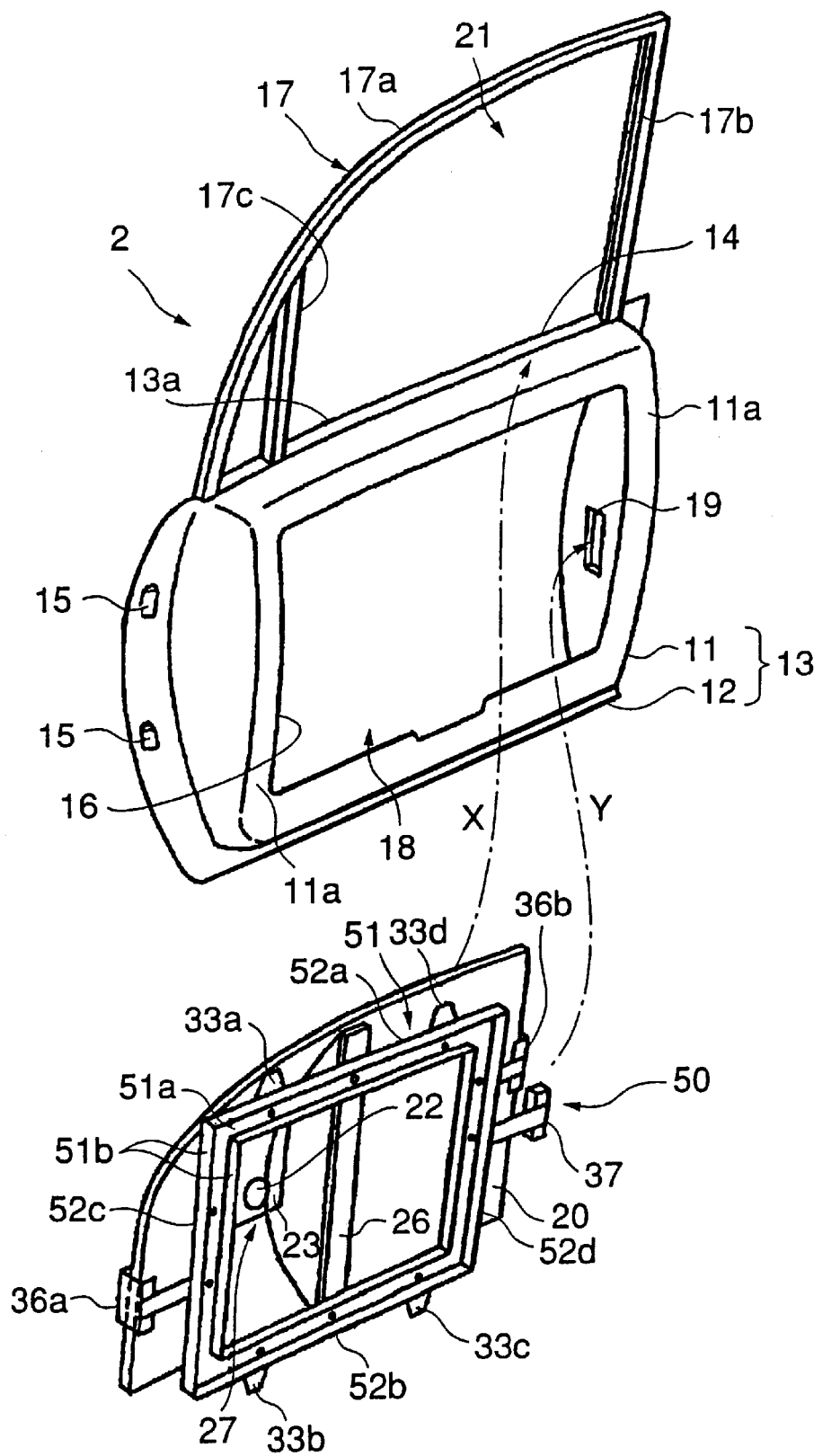
FIG. 5 is an exploded perspective view showing a second embodiment of the present invention.

In order to obtain the door module in which the strength is maintained and the weight is reduced, the module frame having the configuration as described below is preferable. Such configuration is shown FIG. 5. The automobile door 2 shown in FIG. 5 is for a front seat in an automobile. The automobile door 2 is constituted by attaching a door module 50 to the door main body 13 which is fitted to the automobile main body (not shown) so as to be capable of opening and closing, by means of the connecting portions 15 provided at a front side of the automobile door 2.

The door module 50 is an integrated body comprising a module frame 51 and a door equipment such as the glass sheet 20, the regulator 27 and so on which are held on the module frame 51. The module frame 51 is in a substantially □-letter like form in a side view, and includes an upper side 52a, a lower side 52b, a front side 52c and a rear side 52d. The module frame 51 is made of a C-letter like elongated member in cross section having a rear plate 51a and a pair of side plates 51b extending from the rear plate 51a. The module frame 51 in this embodiment is also made of an elongated member obtained by extrusion-molding aluminum.

An upper end and a lower end of the guide rail 26 of the regulator 27 are disposed on the surfaces of the upper side 52a and the lower side 52b, which are opposite to the side where the side plates 51b extend from the rear plate 51a, and are respectively fixed to the upper side 52a and the lower side 52b by spot welding. The motor 22 of the regulator 27 is fixed to the base plate 23 for the motor. An end of the base plate 23 for the motor is disposed on the surfaces of the upper side 52a and the lower side 52c, which are opposite to the side where the side plates 51b extend from the rear plate 51a, and are fixed respectively to the upper side 52a and the front side 52c by spot welding.

The module frame 51 is attached with the brackets 33a to 33d as separate bodies. The brackets 33a to 33d are disposed on the surfaces, which are opposite to the side where the side plates 51b extend from the rear plate 51a, of the upper side 52a and the lower side 52b at a front side and a rear side with respect to the guide rail 26, and are fixed to the upper side 52a and the lower side 52b by spot welding respectively.

The module frame 51 is provided with guide members (glass sheet fitting elements) 36a, 36b which are respectively attached to its front side 52c and rear side 52d, and the latch 37 is attached to the rear side 52d. The door module 50 is inserted into the housing portion 18 in the same process as the first embodiment, and is attached to the door main body 13 by arranging the brackets 33a to 33d on the car interior side surface 11a and fixing it with clips or by fastening with screws.

In the following, explanation will be made as to a state that the door module 50 is attached to the door main body 13. The guide members 36a, 36b fixed to the front side 52c and the rear side 52d hold the glass sheet 20 so that the glass sheet 20 can be guided and can slide between the third sash 17c and the second sash 17b located above.

The dimension in width and the dimension in height in a view according to a projection drawing method, of the substantially □-letter like module frame 51 in a side view, are respectively smaller than the dimension in width and the dimension in height of the mounting opening 16. The dimension in height, in a view according to a projection drawing method, of a shape formed by connecting each projected end portion of the brackets 33a to 33d is larger than the dimension in height of the mounting opening 16.

Figure 6:
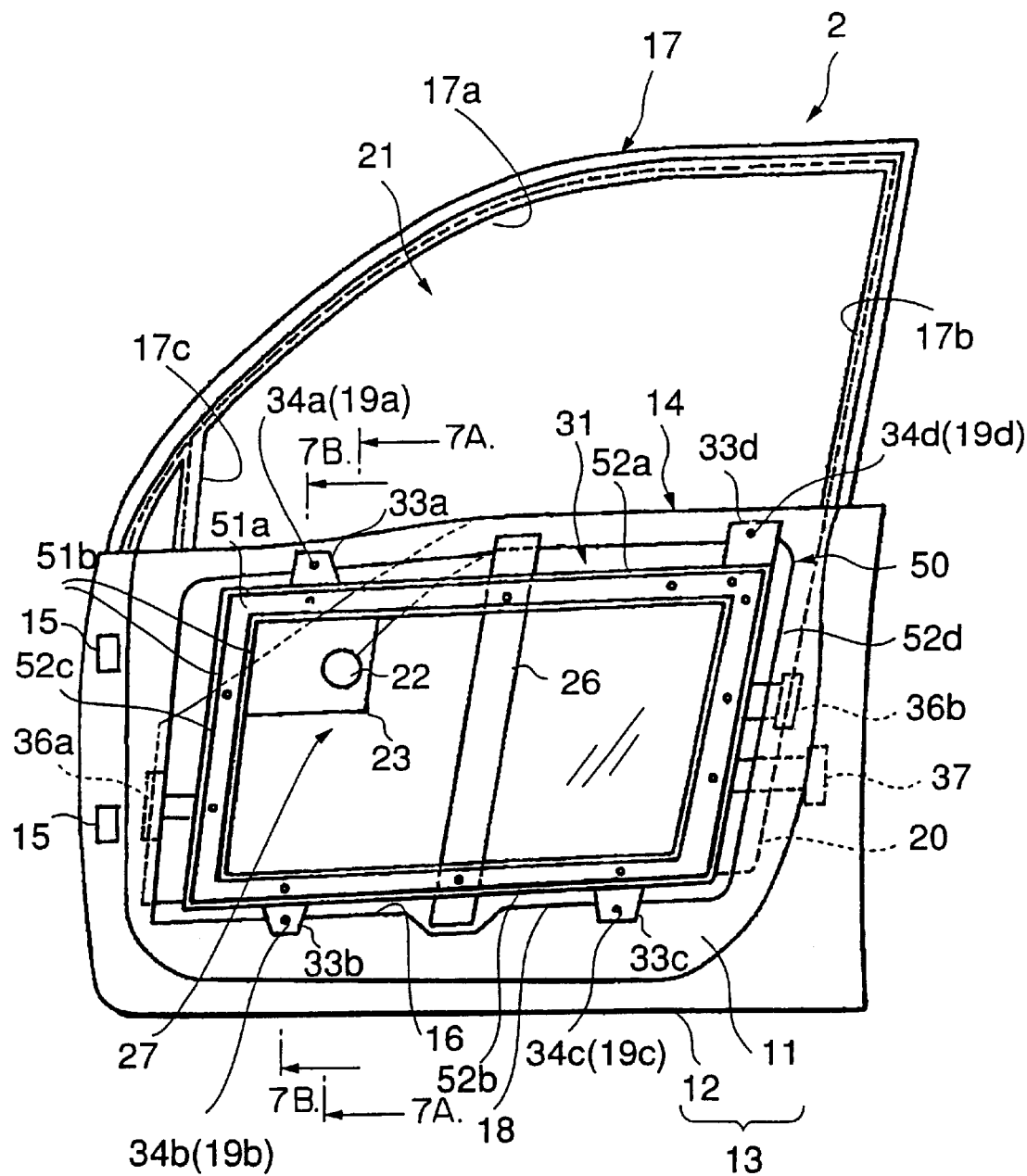
FIG. 6 is a side view of the second embodiment shown in FIG. 5.
Figure 7:
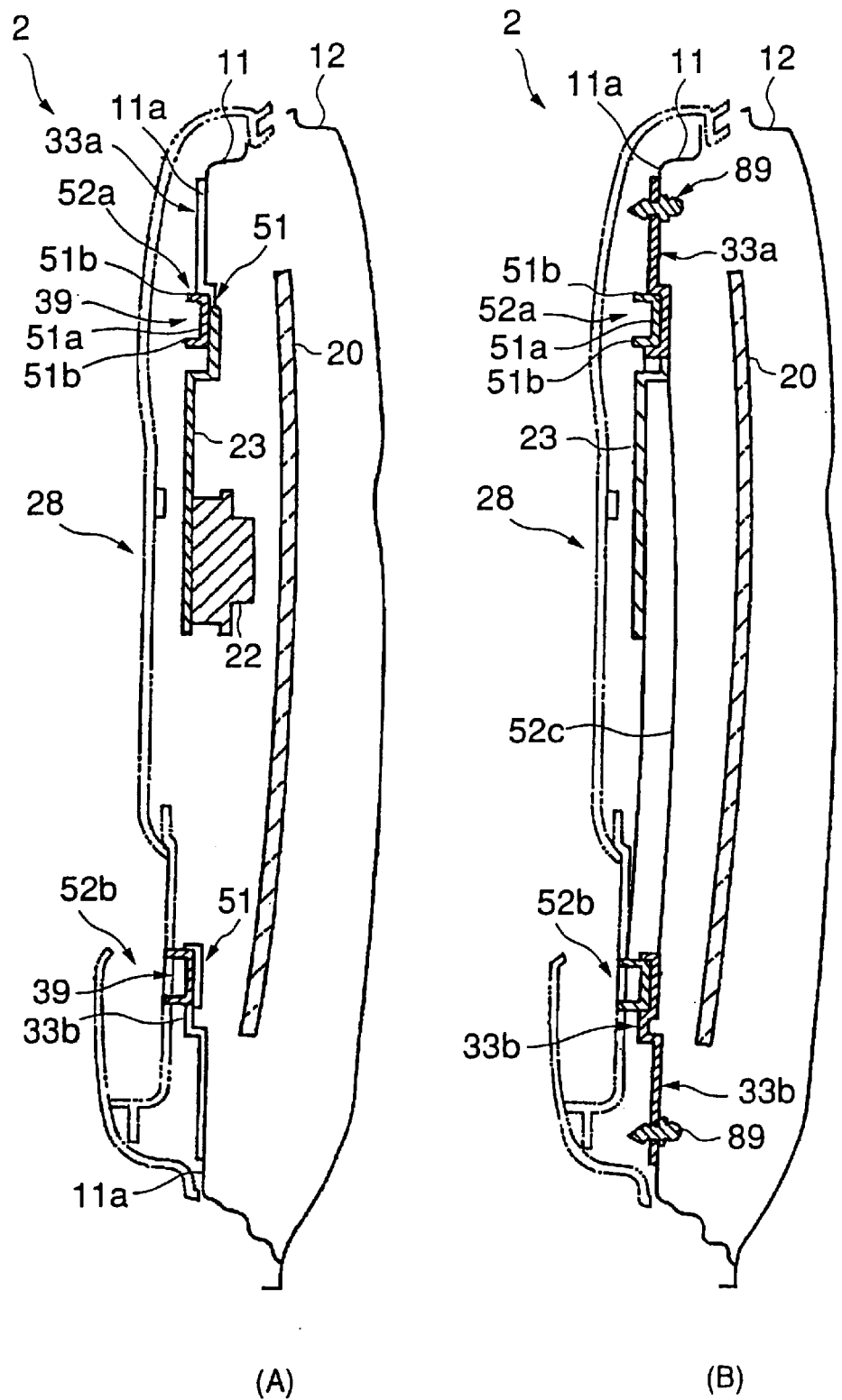
FIG. 7(A) is a cross-sectional view along a line 7(A)—7(A) in FIG. 6, and FIG. 7(*b*) is a cross-sectional view along a line 7(B)—7(B).

The shape in cross section of the module frame will be explained in more detail. FIG. 7(A) and (B) are cross-sectional views along a line VII-1—VII-1 and VII-2—VII-2 in FIG. 6, respectively. The module frame 51 comprises the rear plate 51a and the pair of side plates 51b, 51b extending at the car interior side from the rear plate 51a so that it provides a C-letter like form in cross section. A C-letter like recess 39 is defined by the rear plate 51a and the side plates 51b, 51b. The brackets 33a, 33b are, at their end portions (end portions at a side) at a module frame side, are spot-welded to the surfaces of the upper side 52a and the lower side 52b, which are opposite to the C-letter like recess 39 of the rear plate 51a. Similarly, the base plate 23 for the motor is spot-welded to the surface of the upper side 52a, which is opposite to the C-letter like recess 39 of the rear plate 51a. Each other end (projected end) of the brackets 33a, 33b is fixed to the car interior side surface 11a of the inner panel with clips 89.

Figure 8:
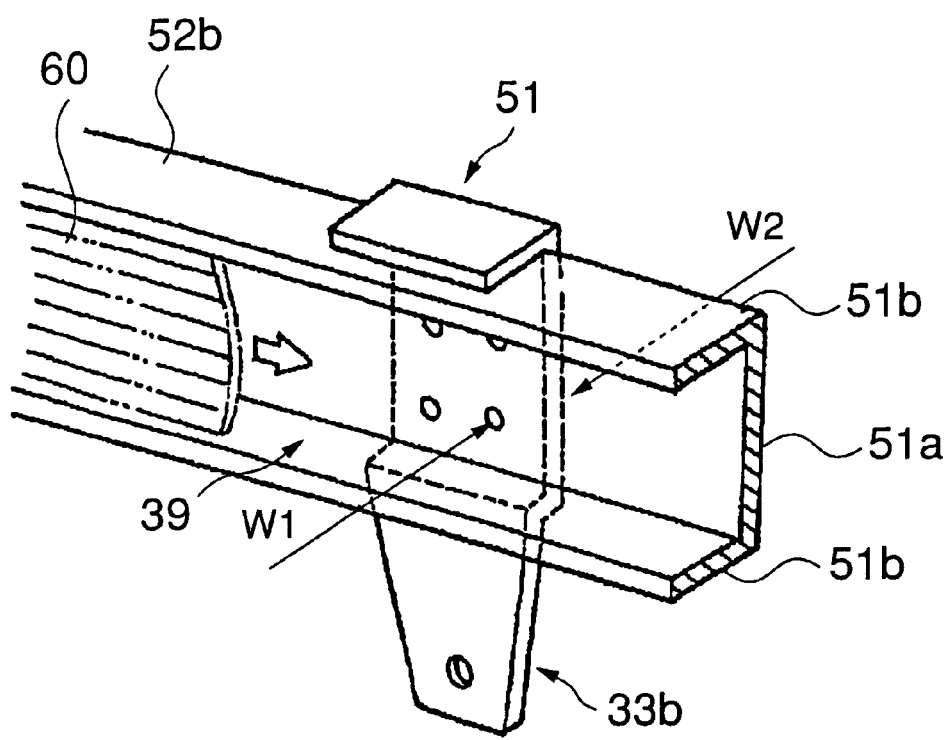
FIG. 8 is an enlarged view of an important portion of the second embodiment shown in FIG. 5.

FIG. 8 is an enlarged view of the lower side 52b and the bracket 33b fixed to the lower side 52b. When the spot welding is conducted, the rear plate 51a and the bracket 33b are clamped by a welding apparatus (not shown), and they are fixed together by welding as indicated by arrow marks W1, W2 in the figure. Since the module frame (the lower side 52b in its embodiment) has a C-letter form in cross section, and the car interior side surface of it is opened, the rear plate 51a and the bracket 33b can be clamped by the welding apparatus. FIG. 8 shows that a flat wire harness 60 is extended in the recess 39 of the module frame 31.

In the automobile door 2 as described above, the upper side 52a, the lower side 52b, the front side 52c and the rear side 52d are made of a C-letter like elongated member in cross section. Accordingly, the strength of the module frame 31 is improved while an increase of weight can be suppressed, in comparison with a module frame made of belt-like flat plate. Therefore, the glass sheet 20 can smoothly be moved vertically, and stability in the operation of the door equipment is high.

Since the rear plate 31a is disposed at the car exterior side so that the C-letter like recess 39 faces the car interior side, it can be easy to fix the brackets 33a to 33d as separate bodies, the guide rail 26, the guide members 36a, 36b and so on to the rear plate 31a by spot welding or the like. Further, the wire harness can easily and certainly be extended by extending the wire harness 60 in the C-letter like recess 39 of the module frame 51.

When the module frame is formed by using the elongated member, it is preferable to construct as follows. Namely, when a single elongated member is bent to form an annular module frame as shown in the first embodiment and the second embodiment, it is preferable to connect an end of the elongated member to the other end by means of a bracket which is also used for attaching the door module to the door main body. The reason is explained exemplifying the second embodiment.

Figure 9:
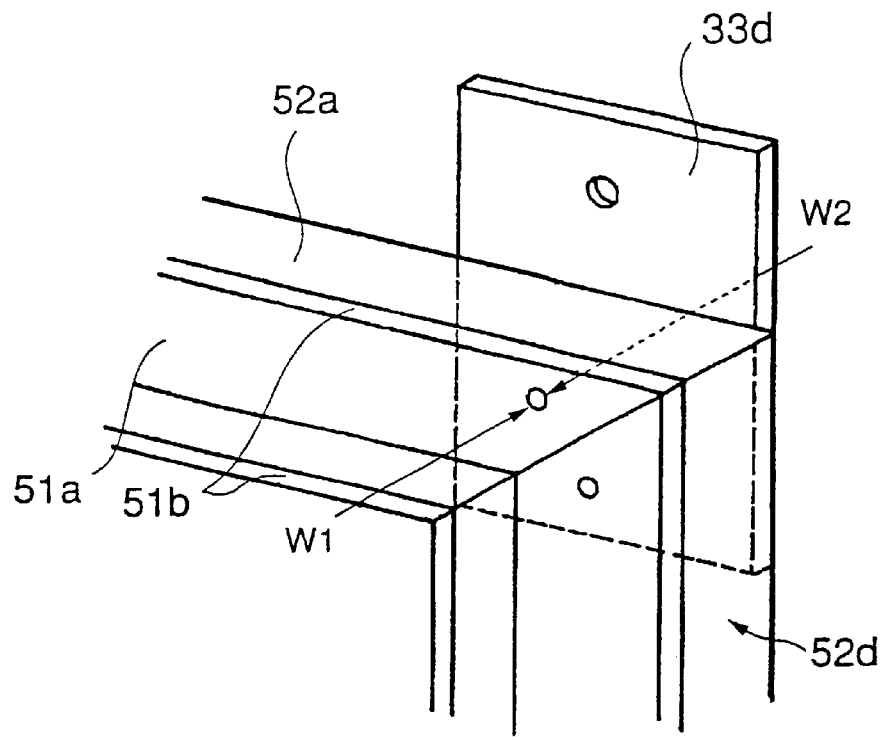
FIGS. 9(A) and (B) are enlarged views of an important portion of the embodiment shown in FIG. 5.
Figure 9:
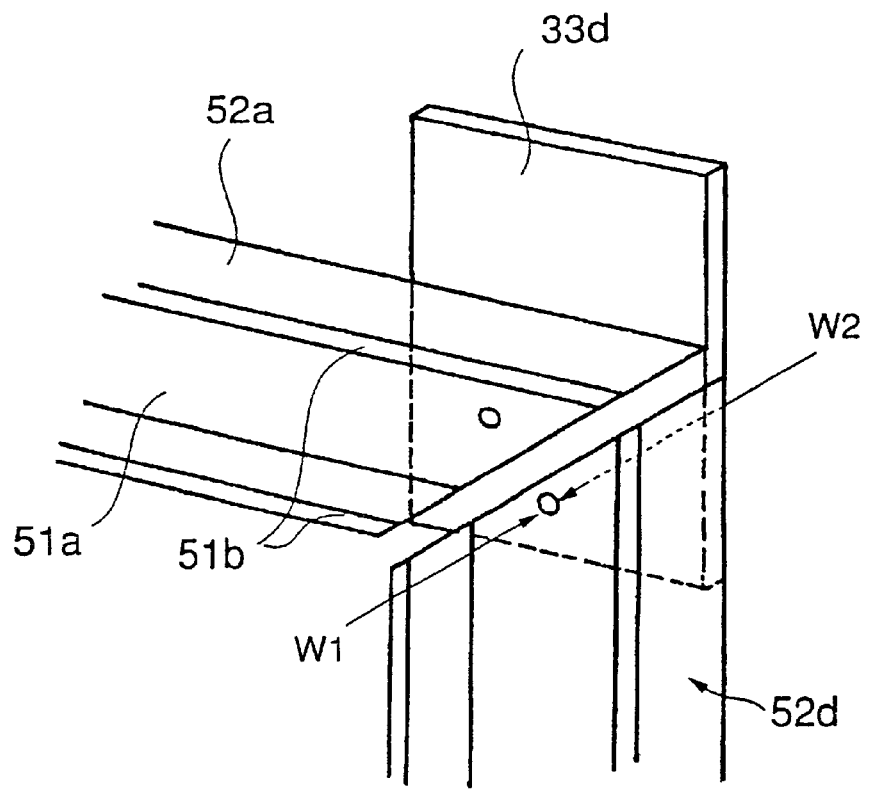

FIG. 9(A) is an enlarged view of the bracket 33d fixed to an end portion of the upper side 52a and an end portion of the rear side 52d. The end portion of the upper side 52a and the end portion of the rear side 52d are respectively in a shape formed by cutting them at a predetermined angle (here, 450). The bracket 33d is made of a flat plate member; is disposed on the surfaces of the upper side 52a and the rear side 52d, which are opposite to the side where the side plates 51b extend from the rear plate 51a, and they are connected together by spot welding.

When the spot welding is conducted, the rear plate 51a and the bracket 33d are clamped by a welding apparatus (not shown), and they are connected by welding as indicated by arrow marks W1, W2 in the figure. Since the module frame (here, the upper side 52 and the rear side 52d) is in a C-letter like form in cross section, and the C-letter like recess 39 opens at the car interior side, the rear plate 51a and the bracket 33d can be clamped by the welding apparatus.

The end portion of the upper side 52a and the end portion of the rear side 52d (the portion to be connected to the end portion of the upper side 52a) are connected by means of the bracket 33d. Accordingly, even when the rear side 52d is short in some degree as shown in FIG. 9(B), the bracket 33d can absorb a dimensional error so that the upper side 52a and the rear side 52d can certainly be connected.

Figure 10:
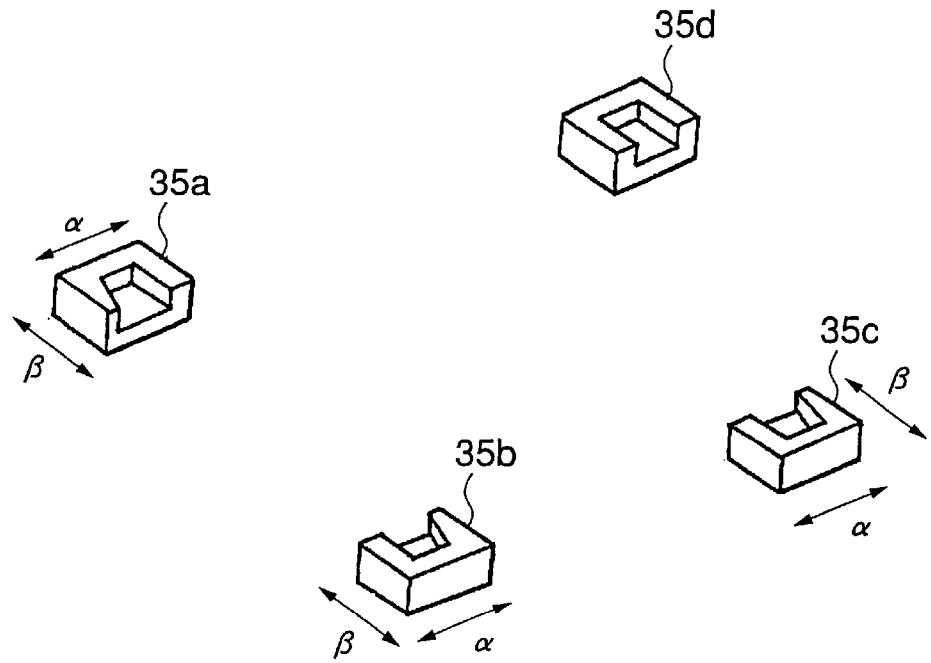
FIG. 10 is a view showing a bracket position determining means.

The process for producing the automobile door module 50 having such module frame 51 will be explained. FIG. 10 shows metal molds 35a to 35d for determining the positions of the brackets. For the metal molds 35a to 35d, it is possible that a metal mold is a fixed metal mold for providing standard and the other metal molds are movable metal molds. FIG. 10 shows that the metal mold 35d is a fixed metal mold and the other metal molds 35a to 35c are movable metal molds movable in directions of arrow marks α and β.

First, the metal molds 35a to 35d are arranged at predetermined positions. Then, the brackets 33a, 33d (see FIG. 2) are placed in recesses formed in upper surfaces of the metal molds 35a to 35d. In this case, the positions of fitting holes 34a to 34d formed in the brackets 33a to 33d correspond to the positions of fitting holes 19a to 19d (see FIG. 1) formed in the inner panel 11 of the door main body 13.

Figure 11:
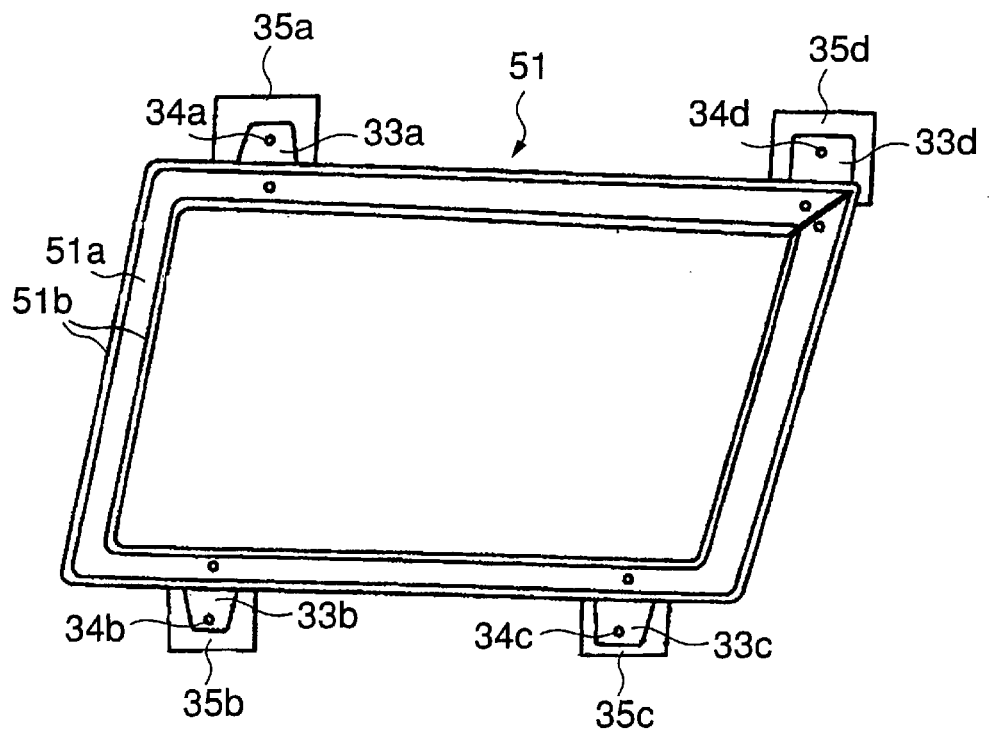
FIG. 11 is a view for explaining the process for producing the door module of the second embodiment shown in FIG. 5.

Then, as shown in FIG. 11, the brackets 33a to 33d are connected by spot welding to the module frame 51 made of a single elongated member which is bent to have a substantially ▢-letter like form in a side view. Thereafter, the door equipment is attached to the module frame 51 on the basis of the positions of the fitting holes 34a to 34d.

In the automobile door 10 as described above, both end portions of the module frame 51 which is formed by bending a single elongated member to have a substantially ▢-letter like form in a side view, are connected by means of the bracket 33d. Accordingly, even when the elongated member is shorter than a predetermined dimension, the dimensional error can be absorbed by the bracket 33d. Further, even when the position of bending, when a single elongated member is to be bent, is not a correct position to be intended in designing, such error of bending can be absorbed.

The operations of fitting the module frame 51 to the brackets 33a to 33d are conducted on the basis of the fitting holes 34a to 34d formed in the brackets 33a to 33d. Further, the operations of fitting the door equipment to the module frame 51 are also conducted on the basis of the fitting holes 34a to 34d formed in the brackets 33a to 33d. Accordingly, it is possible to obtain the door module 30 which can certainly be attached to the door main body 13 and which can locate the door equipment at a correct position of the door main body 13 without requiring a high dimensional accuracy to the module frame 51.

Further, since the front side 52c and the rear side 52d of the module frame 51 are curved to meet the curved shape of the automobile door 10, the requirement of making the automobile door 10 thin can be realized.

Figure 12:
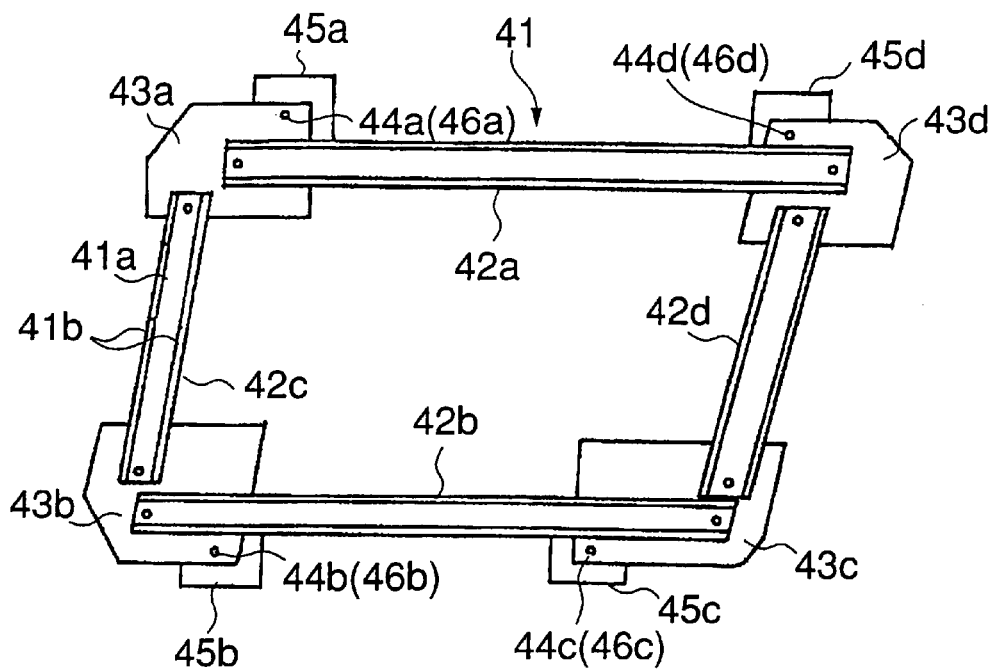
FIG. 12 is a view for explaining another method for producing the door module.

FIG. 12 is a view showing the method for producing the automobile door module according to a modification of the second embodiment. In the module frame of this modified embodiment, 4 elongated members are prepared, and both end portions of each elongated member are connected to form an annular module frame. First, bracket position determining means 45a to 45d are arranged at predetermined positions. Here, as the bracket position determining means 45a to 45d, flat plate like base plates on which each position determining means 46a to 46d projects are used. Brackets 43a to 43d are placed on the bracket position determining means 45a to 45d. At this moment, the position determining means 46a to 46d are inserted into fitting holes 44a to 44d formed in the brackets 43a to 43d. Thus, the positions of the fitting holes 44a to 44d can be corresponded to the positions of the fitting holes 19a to 19d (see FIG. 6) formed in the inner panel 11 of the door main body 13.

Then, 4 linearly elongated members (an upper side, a lower side, a front side and a rear side) 42a to 42d each having a C-letter like form in cross section and being cut at a predetermined length are placed on the brackets 43a to 43d so that they form a substantially ▢-letter like form in a side view. These elongated members 42a to 42d are not required to have a high dimensional accuracy.

Then, a front end portion of the upper side 42a and a rear end portion of it are respectively connected to the bracket 43a and the bracket 43d by spot welding. A front end portion of the lower side 42d and a rear end portion of it are respectively connected to the bracket 43b and the bracket 43c by spot welding. An upper end portion of the front side 42c and a lower end portion of it are respectively connected to the bracket 43a and the bracket 43b by spot welding. An upper end portion of the rear side 42d and a lower end portion of it are respectively connected to the bracket 43d and the bracket 43c by spot welding. The order of spot welding to these portions may be optional.

As described above, the upper side 42a is connected to the front side 42c by means of the bracket 43a; the front side 42c is connected to the lower side 42b by means of the bracket 43b; the lower side 42b is connected to the rear side 42d by means of the bracket 43c and the rear side 42d is connected to the upper side 42a by means of the bracket 43d respectively, whereby a module frame 41 having a substantially ▢-letter like form in a side view can be formed. Then, the door equipment is attached to the module frame 41 on the basis of the positions of the fitting holes 44a to 44d.

In the method for producing the automobile door module as described above, the module frame 41 having a substantially ▢-letter like form in a side view is formed by connecting both end portions of the 4 elongated members (41a, b, c and d) by means of the brackets 33d. Accordingly, it is unnecessary to conduct a bending operation for the elongated members.

Figure 13:
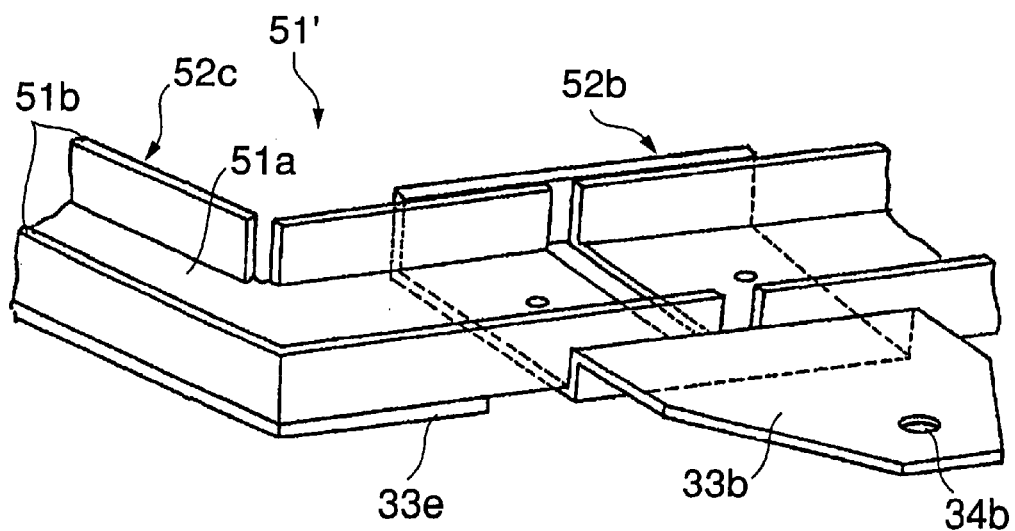
FIG. 13 is an enlarge view of an important portion showing a modified example of the door module of the second embodiment.

In such second embodiment (including a modification), both end portions of the elongated members are connected by means of the brackets at corner portions of the substantially □-letter like module frame 51 in a side view. As a modified embodiment, end portions of elongated members may be connected by a bracket 33b in a linear portion of a module frame 51' as shown in FIG. 13, for example. As shown in FIG. 13, when an inner side plate 51'b is notched in a portion (here, a portion connecting a front side 52'a to a lower side 52'b) where the module frame 51' is bent, the bending of the module frame 51' can be conducted easily and smoothly. A reinforcing plate 33e may be provided on the surface of a rear plate 51'a, which is opposite to the side where the side plate 51'b extends, at a bent portion of the module frame 51'. The bracket 33b may have function as the reinforcing plate 33e.

Figure 14:
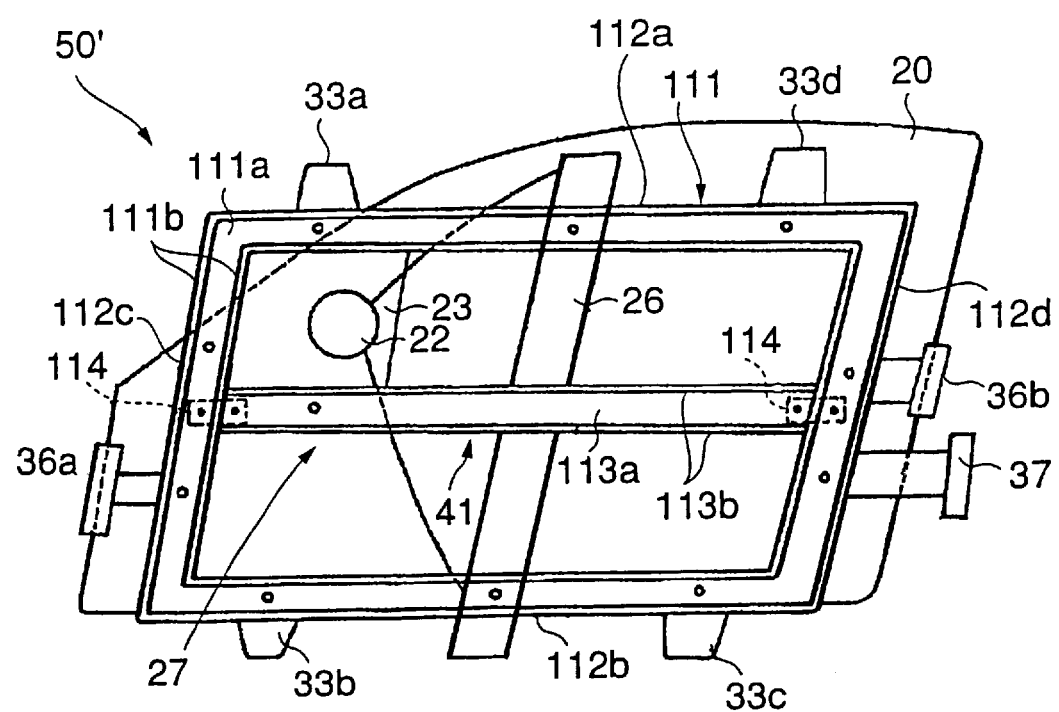
FIG. 14 is a side view showing a third embodiment of the present invention.

FIG. 14 is a side view showing an automobile door module 50' according to a third embodiment. The door module 50' is a modified embodiment of the door module 50 in the second embodiment.

In this embodiment, a reinforcing frame 113 as a separate body is attached to a module frame 111 having a substantially □-letter like form in a side view. This reinforcing frame 113 is also made of a C-letter like member in cross section in the same manner as the module frame 111, which comprises a rear plate 113a and a pair of side plates 113b extending from the rear plate 113a. Here, the reinforcing frame 113 in a linear form in a side view is fitted between a central portion of a front side 112c and a central portion of a rear side 112d of the module frame 111.

The rear plate 113a of the reinforcing frame 113 is disposed at a side of the glass sheet 20 in the same manner as the rear plate 111a of the module frame 111, and is at the same level as the rear plate 111a of the module frame 111. The rear plate 113a of the reinforcing frame 113 and the rear plate 111a of the module frame 111 are connected and fixed with connectors 114. A front end surface of the side plate 113b of the reinforcing frame 113 is in contact with a side plate 111b of the front side 112c of the module frame 111. A rear end surface of the side plate 113b of the reinforcing frame 113 is in contact with a side plate 111b of the rear side 112d of the module frame 111. Here, the base plate 23 for the motor is also fixed to the rear plate 113a of the reinforcing frame 113.

In the automobile door module 50' as described above, the strength of the module frame 111 is improved by the reinforcing frame 113. In particular, since the reinforcing frame 113 is made of a C-letter like member in cross section, and the side plates 113b are fitted between the front side 112c and the rear side 112d which are opposed to each other, the deformation of the module frame 111 can certainly be prevented.

Since the door equipment can be fixed to the rear plate 113a of the reinforcing frame 113, the flexibility of the position for fitting the door equipment can be improved. Since a wire harness and so on can be extended in not only the recess of the module frame 111 but also the recess of the reinforcing frame 113 having a C-letter like form in cross section, the work for extending the wire harness and so on can further be easy and certain.

In this embodiment, in order to connect and fix the reinforcing frame 113 to the module frame 111, the connectors 114 each of which bridges the both rear plates 113a, 111a are used. However, the way of connecting and fixing is not limited thereto. For example, it is possible to project an end portion of the rear plate 113a of the reinforcing frame 113 from the end portion of the side plate 113b to form a projection used for a flange for attaching. Although the C-letter like member is used for the reinforcing frame 113 in this embodiment, a flat plate like member may be used.

As described in the explanation of each of the embodiments, the elongated member according to the present invention is preferably formed to have a C-letter like form in cross section from the viewpoints of improving the strength and easiness for extending the wire harness. Here, the arrangement of the wire harness will be explained in more detail by exemplifying the second embodiment.

As shown in FIGS. 15(A) and (B), a trim 28, which is to be attached to the car interior side surface of the door main body, may be provided with projections 28a, 28b for pushing the wire harness and so on into the module frame 51. In this embodiment, these projections 28a, 28b push a flat wire harness toward the rear plate 51a of the module frame 51 so that the wire harness 60 can certainly be held in the C-letter like recess 39 of the module frame 51.

Figure 16:
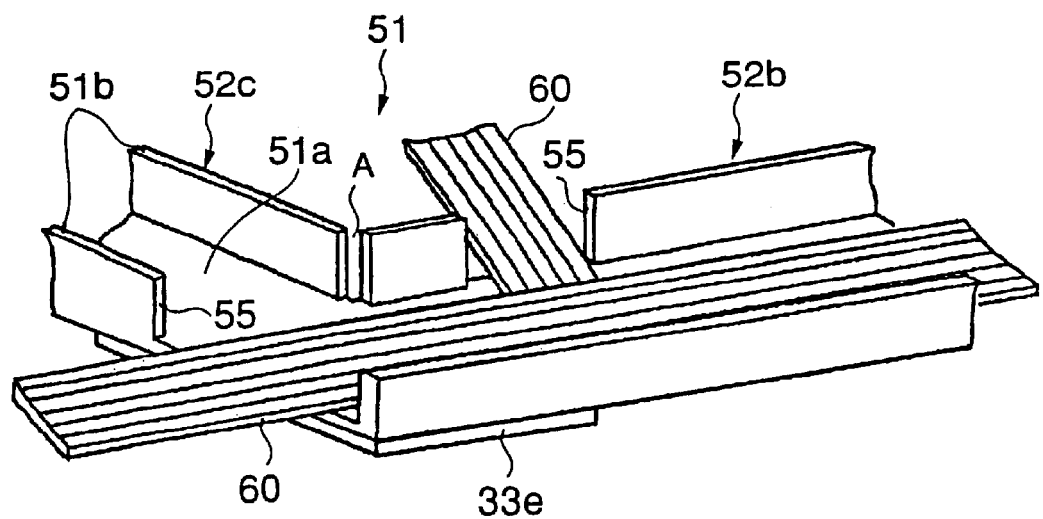
FIG. 16 is a view showing other preferable configurations of the module frame and the reinforcing frame.

In the second embodiment, all the upper side, the lower side, the front side and the rear side of the module frame are constituted by the C-letter like elongated member in cross section. However, as shown in FIG. 16, it is possible to notch a part of a side plate 51b and to draw out the wire harness or the like from the module frame 51 through the notched portion. In this case, notches 55 are provided at predetermined locations of side plates 51b of the front side 52a and the lower side 52b so that the wire harness 60 is drawn out at a front side from the notch 55 of the front side 52c and the wire harness 60 is drawn out upwardly from the notch 55 of the lower side 52b. With such structure, it is possible to extend smoothly the wire harness or the like to the connecting portion between the door main body and the automobile main body, or to orient toward the regulator smoothly while the extension capability of the wire harness or the like is maintained.

When the module frame is formed by bending a single member, or the module frame is formed by connecting a plurality of members wherein a bending operation is conducted to the members, it is preferable that the member or the members have the following configuration. Namely, as shown in FIG. 16 exemplifying the second embodiment, a notch A is formed in the side plate 51b at an inner side at the location (here, the location for connecting the front side 52a to the lower side 52b) where the member for forming the module frame 51 is to be bent. Then, the bending of the module frame 51 can easily and smoothly be conducted.

A reinforcing plate 33e may be provided on the surface of the module frame 51 at the location to be bent, and which is opposite to the side where the side plate 51b extends from the rear plate 51a. Instead of the reinforcing plate 33e, a bracket may be disposed at the bent portion.

Figure 17:
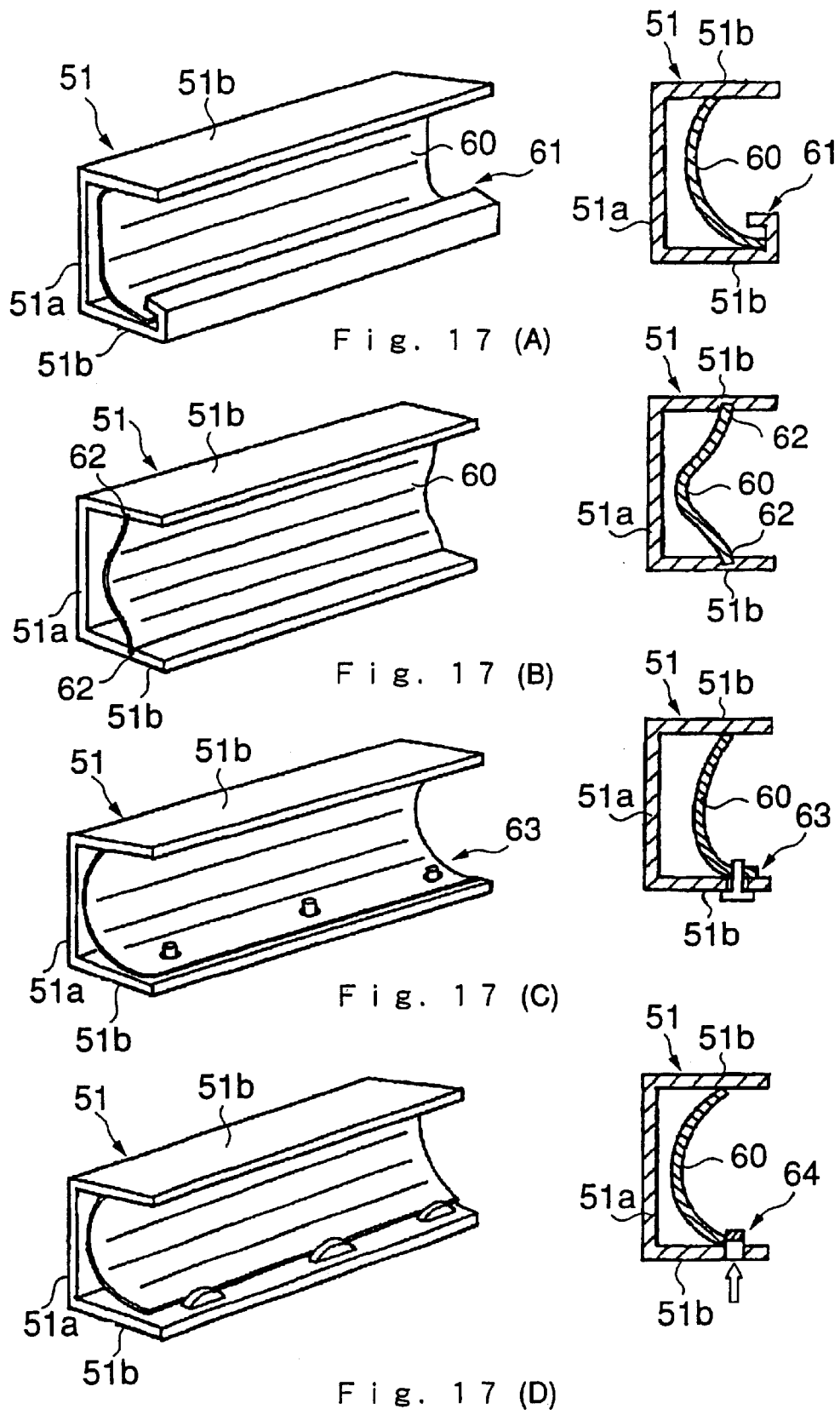
FIGS. 17(A)–(D) are views showing other preferable configurations of the module frame and the reinforcing frame.

Besides, the example of using the trim 28 as shown in FIG. 5 in order to hold the wire harness, the holding means as described below is useful. FIG. 17 shows such means by exemplifying the second embodiment. Each example shown in FIG. 17 is such one provided with an engaging portion for engaging the wire harness in the elongated member. In the module frame 51 shown in FIG. 17(A), an engage portion 61 is formed by bending an end portion of a side plate 51b by a pressing work or the like. In the module frame 51 shown in FIG. 17(B), recesses (here, recessed grooves) formed in the surfaces of side plates 51b which oppose each the other are used as engaging portions 62. In the module frame 51 shown in FIG. 17(C), an engage portion 63 is formed by inserting a penetration member such as a pin, a screw or the like in a through hole formed in a side plate 51b. In the module frame 51 shown in FIG. 17(D), an engage portion 64 is formed by offsetting a predetermined portion of the surface of a side plate 51b by a pressing work. In FIGS. 17(A) to (D), numeral 51a designates a rear plate of the module frame 51.

Figure 15:
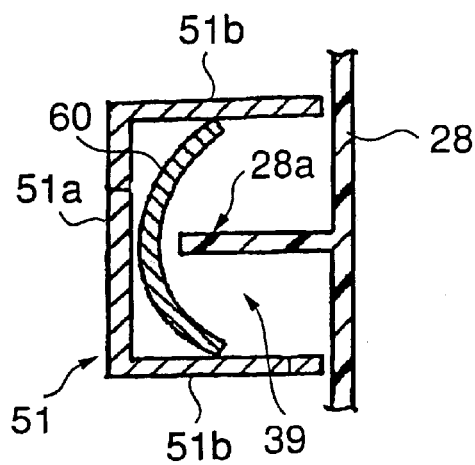
FIGS. 15(A) and (B) are views showing preferable configurations of the module frame and a reinforcing frame.
Figure 15:
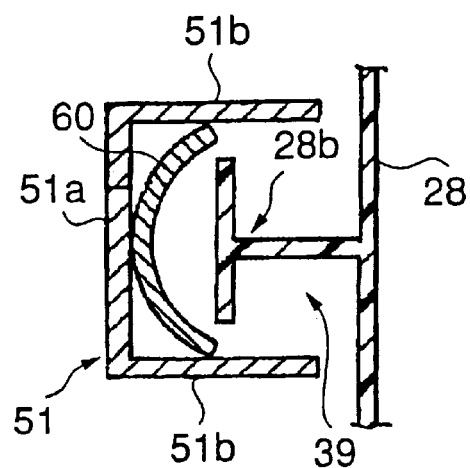

With these structures, the wire harness 60 can certainly be held in the module frame 31. Further, any of these structures can be used together with the trim provided with a projection 28a or 28b as shown in FIG. 15.

In a case of forming the module frame by using a single or a plurality of elongated members, there is the structure as described below, other than the structures according to the above-mentioned the first to third embodiments wherein ends of the elongated member are connected by means of the bracket.

Figure 18:
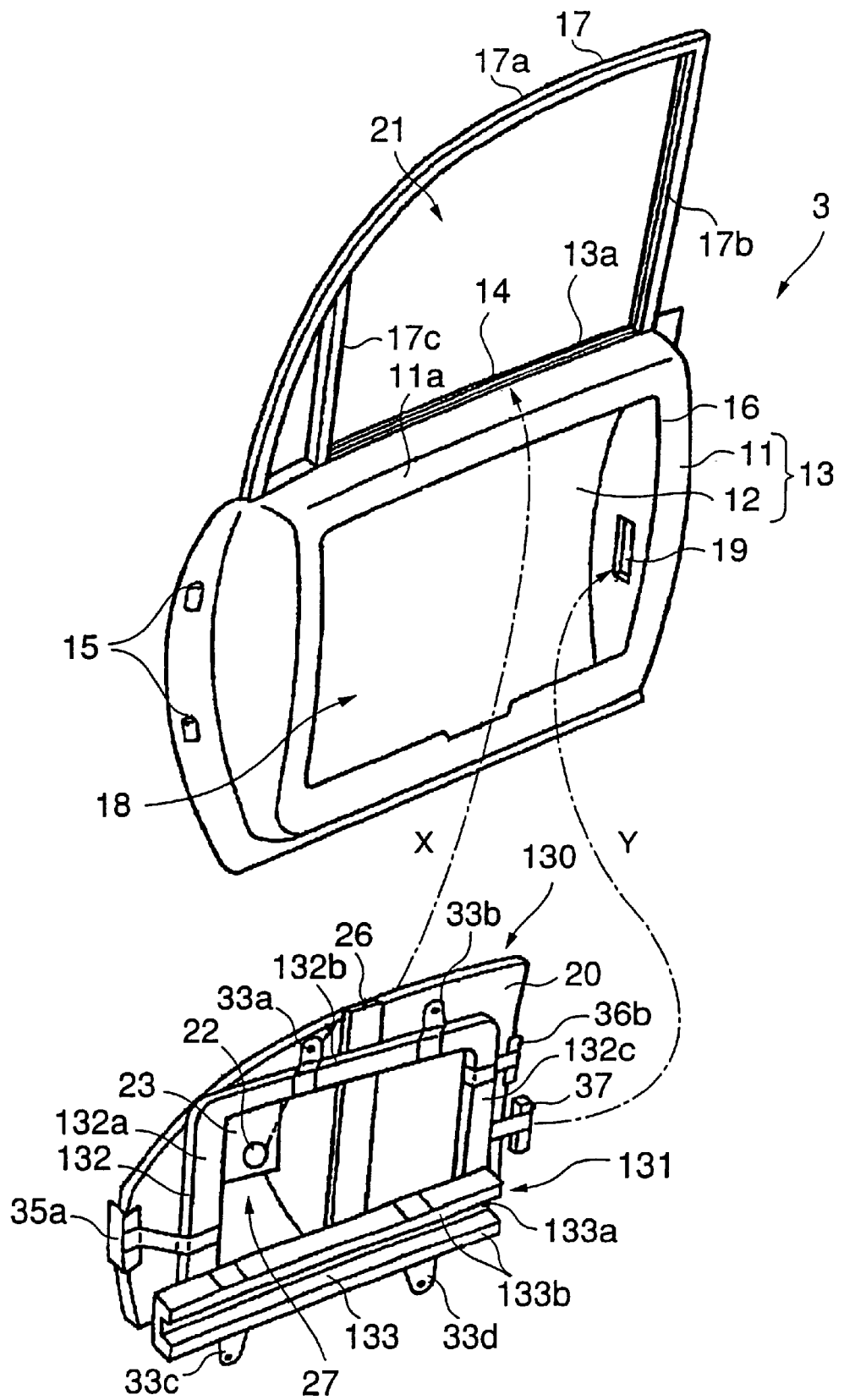
FIG. 18 is an exploded perspective view showing the third embodiment of the present invention.

With reference to FIG. 18, explanation will be made as to the door module according to a fourth embodiment of the present invention. The automobile door 3 of this embodiment is for a front seat of an automobile. The automobile door 3 is constituted by attaching a door module 130 to the door main body 13 which is fitted to the automobile main body (not shown) so as to be capable of opening and closing, by means of the connecting portions 15 provided at the front side of the automobile door 3. The door module 130 is an integrated body comprising a module frame 131 and the door equipment such as the glass sheet 20, the regulator and so on which are held on the module frame.

The module frame 131 has a substantially U-letter like upper frame 132 and a substantially linear lower frame 133 in a side view. The upper frame 132 includes a front side 132a, an upper side 132b and a rear side 132c, and is formed by bending a belt-like elongated flat plate having a predetermined length. The lower frame 133 is made of an elongated member having a C-letter like form in cross section having a rear plate 133a and a pair of side plates 133b extending from the rear plate 133a.

The module frame 131 in this embodiment is made of elongated members obtained by extrusion-molding aluminum. The upper frame 132 is formed by bending twice a single elongated member which has a predetermined shape (a rectangular shape) in cross section and is cut to a predetermined dimension. The lower frame 133 is a single linearly elongated member which has a C-letter like shape in cross section wherein a rear plate 133a and a pair of side plates 133b are provided, and which is cut to a predetermined dimension.

In the upper frame 132, a lower end of the front side 132a and a lower end of the rear side 132c are disposed respectively at a front end and a rear end on the surface (the car exterior side surface) of the lower frame 133, which is opposite to the side where the side plates 133b extend from the rear plate 133a, and are fixed to the lower frame 33 by spot welding. By this, the module frame 131 is rendered to be a substantially □-letter like form in a side view.

An upper end of the guide rail 26 of the regulator 27 is fixed to a substantially central portion in a longitudinal direction (a lateral direction in the figure) of the upper side 132b. A lower end of the guide rail 26 is fixed to a substantially central portion in a longitudinal direction at a car exterior side of the rear plate 133a. The motor 22 of the regulator 27 is fixed to the base plate 23 for the motor. An end portion of the base plate 23 for the motor is fixed to the front side 132a and an upper side 132c by spot welding.

The module frame 131 is attached with the brackets 33a to 33d as separate bodies. Brackets 33a and 33b are disposed respectively at a front side and a rear side, with respect to the guide rail 26, on a car interior side surface of the upper side 132b, and fixed to the upper side 132b by spot welding. Brackets 33c and 33d are disposed respectively at a front side and a rear side, with respect to the guide rail 26, on a car exterior side surface of the rear plate 133a, and fixed to the lower frame 133 by spot welding.

The upper frame 132 is attached with the guide members (glass sheet fitting elements) 36a, 36b at its front side 132a and rear side 132c respectively, and the latch 37 is attached to the rear side 132c.

The door module 130 is attached to the door main body 13 by inserting it into the housing portion 18; arranging the brackets 33a to 33d on the car interior side surface 11a, and fixing it with clips or by fastening with bolts or the like, in the same procedure as in the first and second embodiments.

Figure 19:
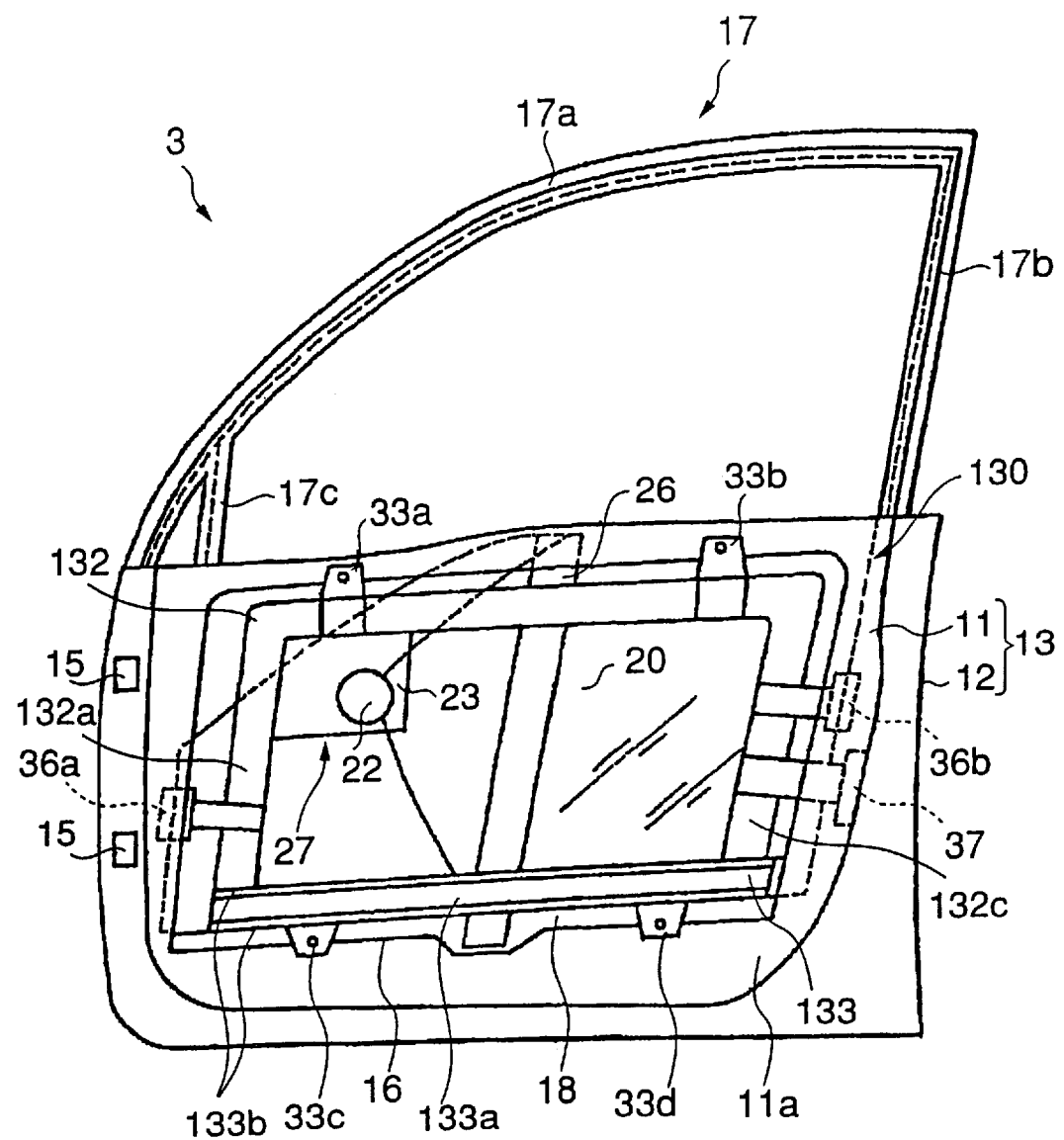
FIG. 19 is a side view of the third embodiment shown in FIG. 18.

Next, description will be made as to a state that the module 130 is attached to the door main body 13 with reference to FIG. 19. The guide members 36a, 36b fixed to the front side 132a and the rear side 132c hold the glass sheet 20 so that the glass sheet 20 can be slided and guided between the third sash 17c and the second sash 17b located above.

The dimension in width and the dimension in height in a view according to a projection drawing method, of the substantially □-letter like module frame 131 in a side view are smaller than those of the mounting opening 16. The dimension in height in a view according to a projection drawing method of a shape formed by connecting the projected end portions of the brackets 33a to 33d is larger than the dimension in height of the mounting opening 16.

Figure 20:
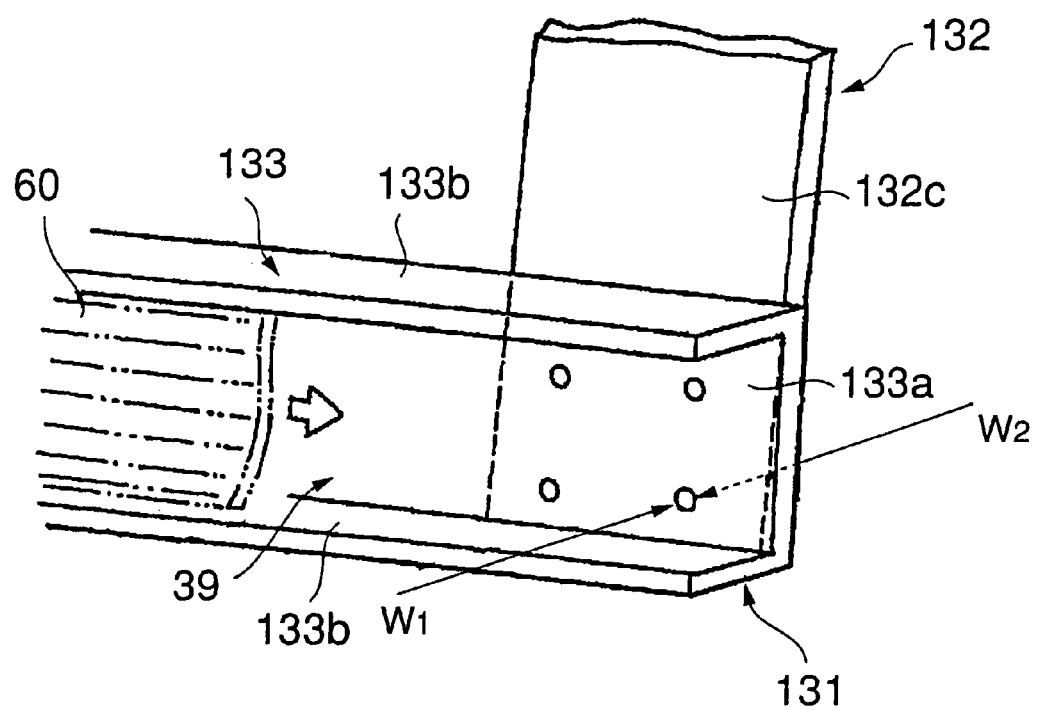
FIG. 20 is an enlarged view of an important portion of the third embodiment shown in FIG. 18.

FIG. 20 is an enlarged view of a location at which the lower frame 133 and the upper frame 132 are joined. As described before, the lower end of the upper frame 132 is fixed to the car exterior side surface of the rear plate 133a by spot welding. When the spot welding is conducted, the rear side 132c and the rear plate 133a are clamped by a welding apparatus (not shown) and are connected by welding as indicated by arrow marks W1, W2 in the figure. Since the lower frame 133 has a C-letter like form in cross section and its car interior side surface is opened, the upper frame 132 and the rear plate 133a of the lower frame 133 can be clamped by the welding apparatus.

An elongated material such as a wire harness or the like can be extended in the C-letter like recess 139 defined by the rear plate 133a and the both side plates 133b, of the lower frame 133. FIG. 20 shows a state that a flat wire harness 160 is extended in the lower frame 133.

As described above, since the automobile door 3 comprises the module frame 131 which is formed by connecting a plurality of frames to provide an annular form in a side view, the number of times of bending work to a single frame can be reduced, and the bending work can be done simply. When the lower frame 133 is a C-letter like frame in cross section having the rear plate 133a and the pair of side plate 133b extending from the rear plate 133a, the strength of the module frame 131 can be improved while an increase of weight can be suppressed.

Since the rear plate 33a of the lower frame 133 is disposed at the car exterior side, and a space is formed between the pair of side plates 133b extending toward the car interior side, in other word, since the car interior side surface of the lower frame 133 is opened, it is easy to fix the rear plate 133a and the upper frame 132 to the brackets and so on by spot welding or fastening. Namely, the module frame can easily be produced. Accordingly, the automobile door 3 provides a high producibility and can improve the strength while an increase of weight and a complicated assembly work are controlled. Further, the reliability on the operation of the door is high.

FIG. 21(A) is a side view showing an automobile door 3' as a modification according to the fourth embodiment, and FIG. 21(B) is an enlarged view of its important portion. The module frame of this embodiment has also a substantially U-letter like upper frame 132 and a substantially linear lower frame 143 in a side view. The lower frame 143 is made of a C-letter like elongated member in cross section having a rear plate 143a and a pair of side plates 143b extending from the rear plate 143a.

In this embodiment, a front end portion of the lower frame 143 is extended forward from the front side 132a of the upper frame 132 and is fixed to the car interior side surface 11a of the inner panel 11. The rear plate 143a of the lower frame 143 is, at its front end portion, fastened to the car interior side surface 11a of the inner panel 11 with a bolt 145.

In the automobile door module as described above, since the front end portion of the lower frame 143 is fastened to the inner panel 11 with the bolt 145, the module frame 140 is firmly fixed to the inner panel 11. Accordingly, noises generated at the time of opening and closing the door can be reduced.

In this specific embodiment, the front end portion of the lower frame 143 is fastened to the car interior side surface 11a of the inner panel with the bolt 145. However, there is no limitation concerning the method for fixing. The fastening with the bolt is preferable in a point that there is obtainable a good disassembling work for recycling various members. In this embodiment, the front end portion of the lower frame 143 is disposed and fixed to the car interior side surface 11a. However, it is possible to dispose and fix a rear end portion of the lower frame 143 on the car interior side surface 11a.

FIG. 22(A) is a perspective view of an automobile door module 150 according to a fifth embodiment, and FIG. 22(B) is an enlarged view of its important portion. The door module 150 of this embodiment has a module frame 151 comprising an upper frame 152 and a lower frame 153 each having a substantially U-letter like form in a side view. The upper frame 152 is made of a C-letter like elongated member in cross section having a rear plate 152a disposed at a car interior side and a pair of side plates 152b extending at a car exterior side from the rear plate 152a so that a space is formed therebetween. The lower frame 153 is made of a C-letter like member in cross section having a rear plate 153a disposed at a car exterior side and a pair of side plates 153b extending at a car interior side from the rear plate 153a so that a space is formed therebetween. Here, the upper frame 152 and the lower frame 153 are constituted by the same member wherein the side plates 152b, 153b are projected in the opposite direction respectively.

In the module frame 151, the upper frame 152 and the lower frame 153 are disposed symmetrically so as to provide a substantially □-letter like form in a side view, and the rear plates 152a, 153a of the both frames 152, 153 are, at their end portions, fixed to each other by spot welding.

When the end portions of the upper and lower frames 152, 153 are connected together by spot welding, the rear plate 152a and the rear plate 153a are clamped by a welding apparatus (not shown), and they are welded together as indicated by arrow marks W1, W2 in the figure.

In the embodiment having the above-mentioned structure, since the annular module frame is formed by disposing the same members symmetrically, the production control of these members can be easily. Further, it is possible to extend a wire harness in C-letter like recess in cross section of the lower frame 153 having the car interior side surface opened.

Figures 23A, 23B:
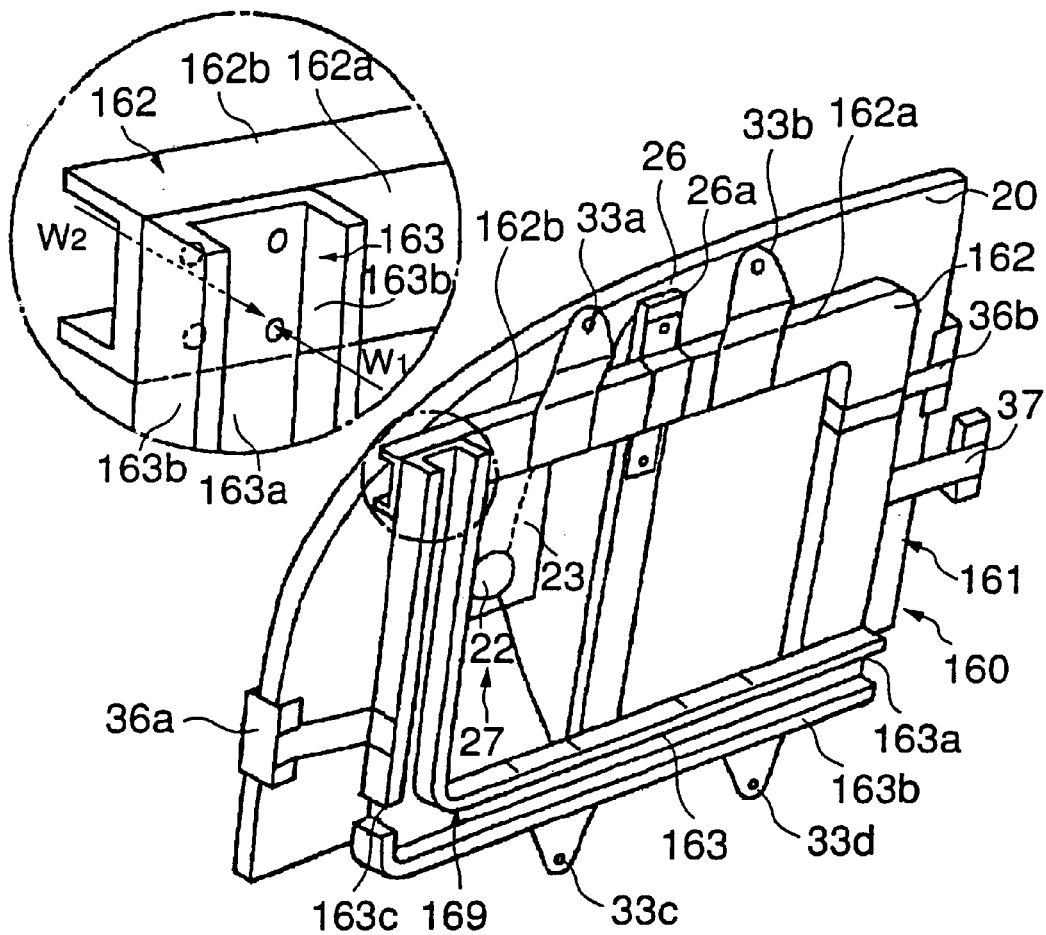

FIG. 23(A) is a perspective view of an automobile module 160 as a modification of the fifth embodiment, and FIG. 23(B) is an enlarged view of its important portion. The door module 160 of this embodiment has a substantially □-letter like module frame 161 in a side view which is formed by connecting a substantially L-letter like upper frame 162 in a side view and a lower frame 163. The upper frame 162 is made of a C-letter like elongated member in cross section having a rear plate 162a disposed at a car interior side and a pair of side plates 162b extending at a car exterior side from the rear plate 162a. The upper frame 162 constitutes an upper side and a rear side of the module frame 161. The lower frame 163 is made of a C-letter like elongated member in cross section having a rear plate 163a disposed at a car exterior side and side plates 163b extending at a car interior side from the rear plate 163a. The lower frame 163 constitutes a front side and a lower side of the module frame 161.

In a C-letter like recess 169 of the lower frame 163, a wire harness or the like can be extended as shown in FIG. 20. When the module frame 161 is attached to the door main body, the wire harness connected to the door lock assembly can be extended from a rear end (a right end in FIG. 23) of the C-letter like recess 169 of the lower frame 163 toward its front end. Then, the wire harness can be projected from the lower frame 163 through a notch 163c formed in the side plate 163b at a predetermined position near the front end of the lower frame 163, whereby the wire harness can be oriented toward the automobile main body. A wire harness connected to the regulator 27 can also be extended in the C-letter like recess 169.

In the present invention, appropriate modification, improvement and so on are possible. The window opening, windowpane, door main body, regulator, module frame or the like are optional and unlimited as far as the object of the present invention can be achieved. For example, although the example of the automobile door for a front seat has been explained in the above-mentioned embodiments, the automobile door and the door module of this embodiment can be applied to an automobile door and a back door for a rear seat.

The door module to be housed in the housing portion of the door main body may be such that the entire portion of the door module is housed in the housing portion or a part of it is projected from the housing portion, which depends on the kinds or the size of the door equipment unified to the module frame. For example, the case that the door module is attached to the door main body so that an upper side portion of the windowpane is more or less projected from the slot for vertical movement, includes the case that the door module is substantially housed in the housing portion. Further, in a closing state of the windowpane, the windowpane is positioned at the window opening above the housing portion. However, since such state is an embodiment of use of the door, this is also included in the automobile door of the present invention.

As a concrete example of the shape in a case that the module frame is formed into an annular form in the present invention, a doughnut form can be exemplified other than the □-letter like form as explained in each of the embodiments. The elongated member or members constituting the module frame defines or define the annular appearance. However, an additional frame member may be provided if required.

In the automobile door, a number of electric wires are extended in order to supply a power source or transmit signals from a sensor to the door equipment. The wire harness as described in each of the embodiments corresponds to these electric wires. And, by extending the wire harness in the C-letter like recess of the module frame, the wire harness can easily and certainly be extended. Further, a linear member other than the harness can be guided by the C-letter like recess.

Industrial Applicability

As described above, according to the present invention described in detail with respect to each of the embodiments and without being limited to these embodiments, an automobile door and an automobile door module which satisfy both requirements of (1) the securing of a predetermined strength-rigidity and (2) weight saving which were difficult in the conventional technique, can be obtained without reducing the strength.

The entire disclosures of Japanese Patent Application No. 2000-181705 filed on Jun. 16, 2000, Japanese Patent Application No. 2000-181706 filed on Jun. 16, 2000 and Japanese Patent Application No. 2000-184808 filed on Jun. 20, 2000 including specifications, claims, drawings and summaries are incorporated herein by reference in their entireties.

What is claimed is:

1. An automobile door comprising a door main body having a housing portion which is disposed adjacent to a window opening and is capable of housing a windowpane for opening and closing the window opening and a door module housed in the housing portion and attached to the door main body, wherein the door module comprises the windowpane, a door equipment including at least a regulator having a motor for moving the windowpane between the window opening and the housing portion, and a module frame on which the door equipment is integrally held, and wherein the module frame comprises a channel, C-shaped in cross-section and having an annular shape encircling a center area therein; the open end of the C-shaped cross-section facing toward an interior side of the automobile door; the regulator is provided with a rail for guiding the windowpane when the windowpane is moved by the motor; the motor is disposed in the center area of the module frame, and at least one end of the rail projects beyond an outer periphery of the annular shape of the module frame and is mounted to the door main body.

2. The automobile door according to claim 1, wherein the regulator is a wire regulator.

3. The automobile door according to claim 2, wherein the motor is held on a base plate; at least an upper edge or a lower edge of the base plate is fixed to the module frame, and the motor is attached to the module frame by the base plate.

4. The automobile door according to claim 3, wherein the length between an upper end and a lower end of the base plate substantially equals the length between an upper end of an upper side and a lower end of a lower side of the module frame.

5. The automobile door according to claim 1, wherein the motor is held on a base plate; at least an upper edge or a lower edge of the base plate is fixed to the module frame, and the motor is attached to the module frame by the base plate.

6. The automobile door according to claim 5, wherein the length between the upper end and the lower end of the base plate substantially equals the length between an upper end of an upper side and a lower end of a lower side of the module frame.

7. The automobile door according to claim 1, wherein the module frame is made of a C-shaped elongated member in cross section, which has a rear plate disposed at a car exterior side and a pair of side plates extending at a car interior side from the rear plate so as to be spaced apart from each other.

8. The automobile door according to claim 7, wherein an electric wire is extended in a C-shaped recess of the elongated member.

* * * * *

UNITED STATES PATENT AND TRADEMARK OFFICE
CERTIFICATE OF CORRECTION

PATENT NO. : 6,754,991 B2  
DATED : June 29, 2004  
INVENTOR(S) : Tokui et al.

Page 1 of 1

It is certified that error appears in the above-identified patent and that said Letters Patent is hereby corrected as shown below:

<u>Title page,</u>
Item [75], Inventors, should read as follows:
-- [75]   Inventors:     Takeshi Tokui, Wako (JP);
                            Mitsuo Hasunuma, Aiko-gun (JP);
                            Hideyuki Hashimoto, Aiko-gun (JP) --

Signed and Sealed this

Thirty-first Day of August, 2004

JON W. DUDAS  
*Director of the United States Patent and Trademark Office*